United States Patent
Leiber et al.

(10) Patent No.: US 12,145,548 B2
(45) Date of Patent: Nov. 19, 2024

(54) BRAKE SYSTEM AND METHOD FOR CONTROLLING A BRAKE SYSTEM

(71) Applicant: IPGATE AG, Pfäffikon (CH)

(72) Inventors: Heinz Leiber, Oberriexingen (DE); Thomas Leiber, Rogoznica (HR)

(73) Assignee: IPGATE AG, Pfäffikon (CH)

( * ) Notice: Subject to any disclaimer, the term of this patent is extended or adjusted under 35 U.S.C. 154(b) by 579 days.

(21) Appl. No.: 17/608,471

(22) PCT Filed: Jan. 28, 2020

(86) PCT No.: PCT/EP2020/051995
§ 371 (c)(1),
(2) Date: Nov. 2, 2021

(87) PCT Pub. No.: WO2020/224814
PCT Pub. Date: Nov. 12, 2020

(65) Prior Publication Data
US 2022/0250600 A1    Aug. 11, 2022

(30) Foreign Application Priority Data

May 3, 2019  (WO) ................ PCT/EP2019/061365
May 3, 2019  (WO) ................ PCT/EP2019/061371

(51) Int. Cl.
*B60T 8/40*  (2006.01)
*B60T 8/94*  (2006.01)
(Continued)

(52) U.S. Cl.
CPC .......... *B60T 13/686* (2013.01); *B60T 8/4081* (2013.01); *B60T 8/94* (2013.01); *B60T 13/142* (2013.01);
(Continued)

(58) Field of Classification Search
CPC ........ B60T 8/94; B60T 8/4081; B60T 13/142; B60T 13/586; B60T 13/686;
(Continued)

(56) References Cited

U.S. PATENT DOCUMENTS 4,503,677 A   3/1985   Crumb et al.
4,813,448 A   3/1989   Leiber
(Continued)

FOREIGN PATENT DOCUMENTS

CN   86107094 A    5/1987
CN    1374218 A   10/2002
(Continued)

OTHER PUBLICATIONS

Office Action issued Jul. 8, 2023 in Chinese Application No. 201880040785.1.
(Continued)

*Primary Examiner* — Christopher P Schwartz
(74) *Attorney, Agent, or Firm* — Panitch Schwarze Belisario & Nadel LLP

(57) ABSTRACT

A brake system may include a first pressure supply unit having an electromotive drive and arranged to supply pressure medium to first and second brake circuits; a motor-pump unit to supply pressure medium to at least one of the brake circuits; a second pressure supply unit, connected to the motor-pump unit via first and second hydraulic lines and arranged to supply pressure medium to at least one of the brake circuits; and a valve unit. The second pressure supply unit may be connected via a third hydraulic line to at least one of the brake circuits. The valve unit may include at least one feed valve via which the third hydraulic line may be at least partially reversibly shut off. An isolating valve may be disposed in at least one of the hydraulic lines to at least partially reversibly shut off the at least one hydraulic line.

17 Claims, 6 Drawing Sheets

(51) Int. Cl.
  *B60T 13/14* (2006.01)
  *B60T 13/58* (2006.01)
  *B60T 13/68* (2006.01)
  *B60T 15/02* (2006.01)
  *B60T 17/22* (2006.01)

(52) U.S. Cl.
  CPC .......... *B60T 13/586* (2013.01); *B60T 15/028* (2013.01); *B60T 17/22* (2013.01); *B60T 2270/306* (2013.01); *B60T 2270/402* (2013.01); *B60T 2270/403* (2013.01); *B60T 2270/406* (2013.01); *B60T 2270/60* (2013.01)

(58) Field of Classification Search
  CPC ............... B60T 15/028; B60T 2270/60; B60T 2270/306; B60T 2270/402; B60T 2270/403; B60T 2270/406
  USPC ... 303/3, 10, 11, 15, 20, 114.1, 115.1, 115.2
  See application file for complete search history.

(56) References Cited

U.S. PATENT DOCUMENTS

| | | |
|---|---|---|
| 5,051,861 A | 9/1991 | Purkayastha et al. |
| 5,054,861 A | 10/1991 | Resch |
| 5,826,954 A | 10/1998 | Schmitt et al. |
| 5,941,608 A | 8/1999 | Campau et al. |
| 8,926,027 B2 | 1/2015 | Shimada |
| 9,878,697 B2 | 1/2018 | Leiber et al. |
| 9,914,440 B2 | 3/2018 | Bauer et al. |
| 10,059,321 B2 | 8/2018 | van Zanten et al. |
| 10,688,979 B2 | 6/2020 | Leiber et al. |
| 11,458,943 B2 | 10/2022 | Leiber et al. |
| 11,472,388 B2 * | 10/2022 | Leiber ..................... B60T 8/176 |
| 11,618,424 B2 | 4/2023 | Nakagawa |
| 2003/0201669 A1 | 10/2003 | Yokoyama et al. |
| 2004/0215385 A1 | 10/2004 | Aizawa et al. |
| 2008/0150354 A1 | 6/2008 | Ohlig et al. |
| 2008/0169702 A1 | 7/2008 | Ohnishi |
| 2009/0226298 A1 | 9/2009 | Kajiyama et al. |
| 2010/0113215 A1 | 5/2010 | Jager et al. |
| 2010/0226793 A1 | 9/2010 | Beck |
| 2011/0254362 A1 | 10/2011 | Maury et al. |
| 2011/0285200 A1 | 11/2011 | Hatano et al. |
| 2012/0112525 A1 | 5/2012 | Shimada |
| 2013/0026818 A1 | 1/2013 | Schmidt et al. |
| 2013/0184953 A1 | 7/2013 | Morishita |
| 2014/0028084 A1 | 1/2014 | Biller et al. |
| 2014/0152085 A1 | 6/2014 | Biller et al. |
| 2014/0203626 A1 | 7/2014 | Biller et al. |
| 2014/0284151 A1 | 9/2014 | Yokoyama et al. |
| 2014/0346852 A1 | 11/2014 | Thrasher |
| 2015/0008727 A1 | 1/2015 | Kidera et al. |
| 2015/0020520 A1 | 1/2015 | Feigel et al. |
| 2015/0028667 A1 | 1/2015 | Leiber et al. |
| 2015/0115701 A1 | 4/2015 | Koo |
| 2015/0175146 A1 | 6/2015 | Quirant et al. |
| 2015/0283987 A1 | 10/2015 | Bareiss |
| 2016/0009263 A1 | 1/2016 | Feigel et al. |
| 2016/0031326 A1 | 2/2016 | Ueno |
| 2016/0082937 A1 | 3/2016 | Nakaoka et al. |
| 2016/0082938 A1 | 3/2016 | Vollert et al. |
| 2016/0121860 A1 | 5/2016 | Brown |
| 2016/0229383 A1 | 8/2016 | Leiber et al. |
| 2016/0278245 A1 | 9/2016 | Koga et al. |
| 2016/0311422 A1 | 10/2016 | van Zanten et al. |
| 2016/0339885 A1 | 11/2016 | Linhoff et al. |
| 2016/0355169 A1 | 12/2016 | Ohlig et al. |
| 2016/0375886 A1 | 12/2016 | Jung |
| 2017/0001612 A1 | 1/2017 | Bauer et al. |
| 2017/0106843 A1 * | 4/2017 | Jeong ..................... B60T 13/745 |
| 2017/0114849 A1 | 4/2017 | Gadke et al. |
| 2017/0129468 A1 | 5/2017 | Besier et al. |
| 2017/0158179 A1 | 6/2017 | Choi et al. |
| 2017/0158184 A1 | 6/2017 | Choi et al. |
| 2017/0182992 A1 | 6/2017 | Matsunaga et al. |
| 2017/0183009 A1 | 6/2017 | Isono et al. |
| 2017/0210363 A1 | 7/2017 | Klinger et al. |
| 2017/0210372 A1 | 7/2017 | Feigel |
| 2017/0264229 A1 | 9/2017 | Murata et al. |
| 2017/0282877 A1 | 10/2017 | Besier et al. |
| 2017/0282879 A1 | 10/2017 | Matsunaga |
| 2017/0282881 A1 | 10/2017 | Nakamura |
| 2017/0327098 A1 | 11/2017 | Leiber et al. |
| 2017/0341632 A1 | 11/2017 | Han et al. |
| 2017/0361825 A1 | 12/2017 | Drumm et al. |
| 2018/0006505 A1 | 1/2018 | Nakano et al. |
| 2018/0079313 A1 | 3/2018 | Foitzik et al. |
| 2018/0093576 A1 | 4/2018 | Ayala et al. |
| 2018/0118183 A1 | 5/2018 | Spieker |
| 2019/0016321 A1 | 1/2019 | Dinkel |
| 2019/0039583 A1 | 2/2019 | Besier et al. |
| 2019/0202425 A1 | 7/2019 | Feigel et al. |
| 2019/0241167 A1 | 8/2019 | Peichl et al. |
| 2019/0308596 A1 | 10/2019 | Besier et al. |
| 2019/0344769 A1 | 11/2019 | Zimmermann et al. |
| 2020/0039490 A1 | 2/2020 | Kobayashi et al. |
| 2020/0139948 A1 | 5/2020 | Leiber et al. |
| 2020/0290581 A1 | 9/2020 | Kawakami et al. |
| 2020/0307536 A1 | 10/2020 | Biller |
| 2020/0317174 A1 | 10/2020 | Terasaka et al. |
| 2021/0053546 A1 | 2/2021 | Plewnia |
| 2021/0114569 A1 | 4/2021 | Yamamoto |
| 2021/0122348 A1 | 4/2021 | Leiber |
| 2022/0126802 A1* | 4/2022 | Leiber ................... F15B 13/025 |
| 2022/0135010 A1* | 5/2022 | Leiber ................... B60T 13/745 303/3 |

FOREIGN PATENT DOCUMENTS

| | | |
|---|---|---|
| CN | 101896382 A | 11/2010 |
| CN | 102556031 A | 7/2012 |
| CN | 103010199 A | 4/2013 |
| CN | 103264639 A | 8/2013 |
| CN | 104039615 A | 9/2014 |
| CN | 104105626 A | 10/2014 |
| CN | 104640752 A | 5/2015 |
| CN | 105026232 A | 11/2015 |
| CN | 105584472 A | 5/2016 |
| CN | 105799670 A | 7/2016 |
| CN | 105813911 A | 7/2016 |
| CN | 106458179 A | 2/2017 |
| CN | 106794829 A | 5/2017 |
| DE | 3236535 A1 | 4/1984 |
| DE | 3307337 C2 | 11/1991 |
| DE | 195 41 601 A1 | 5/1997 |
| DE | 102005017958 A1 | 4/2006 |
| DE | 102005018649 A1 | 10/2006 |
| DE | 10 2005 055 751 A1 | 11/2006 |
| DE | 19929414 B4 | 10/2007 |
| DE | 102007059374 A1 | 6/2009 |
| DE | 10 2009 033 499 A1 | 1/2010 |
| DE | 102010001532 A1 | 8/2011 |
| DE | 102010003081 A1 | 8/2011 |
| DE | 102010045617 A1 | 3/2012 |
| DE | 11 2009 004 636 A5 | 6/2012 |
| DE | 102012201535 A1 | 10/2012 |
| DE | 102012205860 A1 | 10/2012 |
| DE | 102012210809 A1 | 1/2013 |
| DE | 11 2011 103274 A5 | 7/2013 |
| DE | 102012002791 A1 | 8/2013 |
| DE | 102013214212 A1 | 2/2014 |
| DE | 102014200071 A1 | 9/2014 |
| DE | 102014205645 A1 | 10/2014 |
| DE | 102014009127 A1 | 6/2015 |
| DE | 102015208148 A1 | 12/2015 |
| DE | 102014109628 A1 | 1/2016 |
| DE | 202015107079 U1 | 2/2016 |
| DE | 102014222753 A1 | 5/2016 |
| DE | 102014117726 A1 | 6/2016 |
| DE | 102014225958 A1 | 6/2016 |
| DE | 202015008975 U1 * | 7/2016 | ............... B60T 1/10 |
| DE | 102015103859 A1 | 9/2016 |
| DE | 102015104246 A1 | 9/2016 |

(56) References Cited

FOREIGN PATENT DOCUMENTS

| | | |
|---|---|---|
| DE | 102016203111 A1 | 9/2016 |
| DE | 10 2015 106 089.2 A1 | 10/2016 |
| DE | 102016217273 A1 | 3/2017 |
| DE | 10 2016 224 057 A1 | 6/2017 |
| DE | 102016224062 A1 | 6/2017 |
| DE | 102016105232 A1 | 9/2017 |
| DE | 10 2016 112 971 A1 | 1/2018 |
| DE | 102016211982 A1 | 1/2018 |
| EP | 0095403 A1 | 11/1983 |
| EP | 0 105 219 A2 | 4/1984 |
| EP | 1103436 A2 | 5/2001 |
| EP | 1371535 A2 | 12/2003 |
| EP | 1533537 A2 | 5/2005 |
| EP | 1 964 739 A1 | 9/2008 |
| EP | 2225133 B1 | 9/2010 |
| EP | 2409885 A1 | 1/2012 |
| EP | 2 602 163 B1 | 6/2013 |
| EP | 2719593 A1 | 4/2014 |
| EP | 2744691 A1 | 6/2014 |
| EP | 2995516 A1 | 3/2016 |
| EP | 2998173 A1 | 3/2016 |
| GB | 2443921 A | 5/2008 |
| GB | 2540193 A | 1/2017 |
| JP | H0656022 A | 3/1994 |
| JP | 2001206209 A | 7/2001 |
| JP | 2006275120 A | 10/2006 |
| JP | 2012126170 A | 7/2012 |
| JP | 2015071382 A | 4/2015 |
| JP | 2016-112946 A | 6/2016 |
| JP | 2016147614 A | 8/2016 |
| KR | 20170012348 A | 2/2017 |
| WO | 2008096224 A1 | 8/2008 |
| WO | 2009/065709 A1 | 5/2009 |
| WO | 2010/088920 A1 | 8/2010 |
| WO | 2010091130 A2 | 8/2010 |
| WO | 2010092083 A1 | 8/2010 |
| WO | 2011029812 A1 | 3/2011 |
| WO | 2011/098178 A1 | 8/2011 |
| WO | 2012/019802 A1 | 2/2012 |
| WO | 2012028568 A1 | 3/2012 |
| WO | 2012034661 A1 | 3/2012 |
| WO | 2012055616 A1 | 5/2012 |
| WO | 2012143175 A2 | 10/2012 |
| WO | 2012143311 A1 | 10/2012 |
| WO | 2013023953 A1 | 2/2013 |
| WO | 2013072198 A2 | 5/2013 |
| WO | 2014135454 A1 | 9/2014 |
| WO | 2014154631 A2 | 10/2014 |
| WO | 2015078651 A1 | 6/2015 |
| WO | 2015096914 A1 | 7/2015 |
| WO | 2015106892 A1 | 7/2015 |
| WO | 2015173134 A1 | 11/2015 |
| WO | 2016000865 A1 | 1/2016 |
| WO | 2016005372 A1 | 1/2016 |
| WO | 2016012331 A1 | 1/2016 |
| WO | 2016023994 A1 | 2/2016 |
| WO | 2016087505 A1 | 6/2016 |
| WO | 2016096533 A1 | 6/2016 |
| WO | 2016120292 A1 | 8/2016 |
| WO | 2016128172 A1 | 8/2016 |
| WO | 2016146222 A2 | 9/2016 |
| WO | 2016146692 A1 | 9/2016 |
| WO | 2016150745 A1 | 9/2016 |
| WO | 2017022545 A1 | 2/2017 |
| WO | 2017047312 A1 | 3/2017 |
| WO | 2017/135029 A1 | 8/2017 |
| WO | 2017162593 A1 | 9/2017 |
| WO | 2018073039 A1 | 4/2018 |
| WO | 2018130393 A1 | 7/2018 |
| WO | 2019002475 A1 | 1/2019 |
| WO | 2019214833 A1 | 11/2019 |

OTHER PUBLICATIONS

Office Action issued Jul. 10, 2023 in DE Application No. 112018003140.3.
Office Action issued Jul. 10, 2023 in DE Application No. 112018003150.0.
Office Action issued Jul. 20, 2023 in U.S. Appl. No. 18/114,099.
Office Action issued Oct. 20, 2021 in Chinese Application No. 201880040827.1.
Office Action issued May 30, 2022 in Japanese Application No. 2019-570915.
GB Combined Search and Examination Report for the related U.K. Application No. 2219297.5 dated Feb. 1, 2023.
Office Action issued Mar. 10, 2023 in U.S. Appl. No. 17/883,700.
Office Action in U.S. Appl. No. 16/624,505 of Leiber et al., mailed May 12, 2022.
Office Action issued Aug. 24, 2022 in Great Britian Application No. GB2211088.6.
Office Action issued Jun. 6, 2023 in Chinese Application No. 202080042804.1.
Notice of Allowance issued Jan. 4, 2024 in U.S. Appl. No. 16/624,412.
Notice of Allowance issued Oct. 12, 2023 in U.S. Appl. No. 17/883,700.
Office Action issued Dec. 7, 2023 in U.S. Appl. No. 17/053,353.
Office Action issued Nov. 3, 2021 in Chinese Application No. 201880040785.1.
Office Action in U.S. Appl. No. 16/624,412 of Leiber et al., mailed Apr. 20, 2022.
Office Action issued Jan. 21, 2022 in British Application No. 2000691.2.
GB Search Report for the related U.K. Application No. 2211088.6 dated Aug. 23, 2022.
GB Combined Search and Examination Report for the related U.K. Application No. 2211088.6 dated Aug. 24, 2022.
Office Action issued Jun. 8, 2023 in U.S. Appl. No. 16/624,412.
Int'l Search Report and Written Opinion issued Mar. 16, 2018 in Int'l Application No. PCT/EP2017/071738, translation of ISR only.
Int'l Search Report and Written Opinion issued Oct. 30, 2018 in Int'l Application No. PCT/EP2018/061995, translation of ISR only.
Int'l Search Report and Written Opinion issued Nov. 30, 2018 in Int'l Application No. PCT/EP2018/066436, translation of ISR only.
Int'l Search Report and Written Opinion issued Aug. 14, 2019 in Int'l Application No. PCT/EP2019/061371.
Int'l Search Report and Written Opinion issued Nov. 28, 2018 in Int'l Application No. PCT/EP2018/072363, ISR Translation Only.
Int'l Search Report and Written Opinion issued Aug. 13, 2019 in Int'l Application No. PCT/EP2019/061365, Translation of ISR Only.
Office Action issued Aug. 6, 2021 in U.S. Appl. No. 16/625,228 by Leiber.
Office Action issued Sep. 14, 2021 in Chinese Application No. 201780093316.1.
GB Combined Search and Examination Report for the related U.K. Application No. 2212200.6 dated Nov. 2, 2022.
GB Combined Search and Examination Report for the related U.K. Application No. 2213645.1 dated Nov. 4, 2022.
Office Action in U.S. Appl. No. 16/624,505 of Leiber et al., mailed Nov. 25, 2022.

* cited by examiner

BRAKE SYSTEM AND METHOD FOR CONTROLLING A BRAKE SYSTEM

CROSS-REFERENCE TO RELATED APPLICATIONS

This application is a Section 371 of International Application No. PCT/EP2020/051995, filed Jan. 28, 2020, which was published in the German language on Nov. 12, 2020 under International Publication No. WO 2020/224814 A1, which claims priority under 35 U.S.C. § 119(b) to International Patent Application No. PCT/EP2019/061365, filed May 3, 2019, and International Patent Application No. PCT/EP2019/061371, filed May 3, 2019, the disclosures of which are incorporated herein by reference.

BACKGROUND OF THE INVENTION

The trend towards vehicles with autonomous driving places high demands on the brake system in terms of fault tolerance on the one hand and redundant functions, e.g. for brake pressure generation, power supply and computer functions on the other.

So-called one-box and two-box systems are usually favored. The latter consist of an electric brake booster (BKV), a so-called e-booster, and an ESP system (electronic stability control system).

The known solutions have relatively long lengths and/or a high weight.

In WO2011/098178 (hereinafter referred to as variant A or as a follow-up booster or e-booster), such a solution with a coaxial drive is described, in which an electric motor acts via a transmission and piston on the main cylinder piston (HZ piston). The BKV control is effected via an electrical element and reaction disc as a so-called follow-up booster, the pedal travel is a function of the brake pressure and the volume absorption of the brake system, which requires long pedal travel in the event of fading or brake circuit failure.

WO2009/065709 shows an e-booster likewise with follow-up booster function (hereinafter referred to as variant B, or as a follow-up booster or e-booster). Here the BKV control takes place via pedal travel and/or via a pedal pressure, that is to say the pressure with which the pedal is actuated. A separate pressure supply with electric motor and plunger acts via the amplifier piston on the HZ piston.

WO2012/019802 shows an arrangement similar to WO2011/098178 with coaxial drive in which an electric motor acts on the HZ piston via a transmission and piston (hereinafter variant C). An additional piston cylinder unit is used here, which acts on a travel simulator piston (WS). The pedal travel is thus independent of e.g. fading and brake circuit failure. However, the complexity and the construction length are high.

DE 10 2009 033 499 shows a brake booster with additional ESP unit with hydraulic actuation of the amplifier piston and external pressure supply (hereinafter also referred to as variant D). This arrangement with four or five pistons and six solenoid valves (MV) is complex and unfavorable in length. The non-hydraulically acting travel simulator (WS) is located within the piston-cylinder unit upstream of the main cylinder and cannot be damped or switched via a solenoid valve (MV).

All above-mentioned solutions have a redundant brake booster function, because in case of failure of the BKV motor the ESP unit with pump similarly to the assistance functions with vacuum BKV guarantees the brake function in autonomous driving mode.

In the event of failure of the ESP motor, ABS can continue to function via the possibility of pressure modulation by the BKV motor as described in WO2010/088920. However, this only allows a common pressure control for all four wheels, which does not result in an optimal braking distance.

All previously known one-box systems have a so-called travel simulator (especially for brake-by-wire) in order to implement advanced pedal travel characteristics.

The known systems with e-booster and ESP have only one redundancy in the pressure supply, i.e. if the e-booster fails, there is a redundant pressure supply with redundant power for the brake booster by the ESP. Higher safety requirements are not taken into account.

The assembly, that is to say an arrangement of the individual components of the brake system to form a ready-to-install unit and the overall volume of this unit are of great importance. In particular in brake systems that are used in motor vehicles designed for semi-automated or even fully automated driving, many variants with, for example, a tandem main (brake) cylinder or a single main (brake) cylinder) must be taken into consideration. Examples of known assembly variants are a perpendicular arrangement of a pressure supply unit to an axis of the main (brake) cylinder (as described for example in EP 2 744 691) or a parallel arrangement of the pressure supply unit to the axis of the main (brake) cylinder (as described for example in DE 10 2016 105 232). The latter is characterized especially by a smaller overall width in comparison to the first-mentioned assembly variant.

BRIEF SUMMARY OF THE INVENTION

Object of the Invention

Based on the prior art, it is the object of this invention to provide an improved brake system.

In particular, the invention is based on the object of creating a brake system for use in autonomous driving operation (also referred to hereinafter as AD) and/or electric vehicles/hybrid vehicles with increasingly strong recuperation power (energy recovery by braking via generator/or drive motor in generator operation). The weight is preferably reduced and/or the dimensions of the system are reduced and/or reliability is increased.

Preferably, an economical brake system for autonomous driving operation shall also be created, which fulfils all required redundancies as well as very high safety requirements.

Furthermore, if the ESP should fail, both an adequate function of the ABS in respect of braking distance and stability, and an adequate function of the recuperation are to be achieved with the brake system.

In particular, the object of the present invention is to provide an improved brake system having a redundant pressure supply, a very broad functional scope and very high availability, in particular should the brake circuit fail, alongside a very short length and low costs. Furthermore, a method shall be provided which allows a very high availability even in the event of partial failures/leaks.

Solution According to the Invention

This object may be achieved by a brake system and a method according to various ones of the accompanying claims.

The object is achieved in particular by a brake system, comprising:

a first pressure supply unit, having an electromotive drive which is configured to supply a pressure medium to at least one brake circuit and at least one second brake circuit, a motor-pump unit, which is configured to supply the pressure medium to at least one of the brake circuits, a second pressure supply unit, which configured to supply the pressure medium to at least one of the brake circuits, wherein the second pressure supply unit is connected to the motor-pump unit via at least one first hydraulic line and via at least one second hydraulic line, a valve unit.

At least one of the brake circuits is connected to the second pressure supply unit via at least one third hydraulic line. The valve unit comprises at least one feed valve, via which the third hydraulic line can be at least partially reversibly shut off, wherein an isolating valve is arranged in at least one of the hydraulic lines and can be used to at least partially reversibly shut off the hydraulic line in question.

The pressure supply unit can be understood generally to be a unit, in particular a structural unit, of the brake system, which unit provides a brake pressure. The pressure supply unit is thus used to supply the pressure medium to the at least one brake circuit.

The brake system furthermore comprises a valve unit. The valve unit is formed in this case as a hydraulic valve unit. In particular, the valve unit has at least one feed valve formed as a solenoid valve. Solenoid valves have proven themselves to be advantageous in particular due to their simple actuatability.

The feed valve can be embodied as a normally open valve. In normal operation it can be closed, so that no pressure medium passes from the second pressure supply unit into one of the two brake circuits. In the event of a failure of the system, the first and/or the second brake circuit can be pressurized, so that emergency braking is possible as necessary.

It should be noted at this juncture that the feed valve, as in all drive-by-wire systems, is very critical to safety. In the event of a failure, the first pressure supply unit or the pressure generated thereby in the cylinder of the second pressure supply unit acts directly against the pedal force. The displacement of the piston of the second pressure supply unit causes the first pressure supply unit to be deactivated. The driver must apply the necessary braking force using the pedal. In a system that merely complies with the legal requirements, this corresponds to 500 N (corresponds to 40 to 50 bar). This may lead to a source of irritation for the driver, and possibly to an accident.

The normally open solenoid valves used as isolating valves and feed valves have a return spring with two connectors. One of the connectors leads into the armature chamber and is referred to in this application as the armature chamber connector. The other connector is arranged behind the valve seat and will be referred to hereinafter as the valve seat connector. In the closed state, the pressure of the valve seat connector acts against the magnetic force applied by the valve. The valve, however, is designed such that it withstands the necessary pressures.

The feed valve is preferably designed and arranged in such a way that in the closed state it is reliably closed against high pressures in the brake system, in particular in the first and second brake circuit.

To this end, the feed valve in one embodiment is indirectly connected to the first hydraulic line via the valve seat connector.

The expression "can be at least partially shut-off" can be understood here to mean that the valve only limits a volume flow (of pressure medium) through the hydraulic supply line, for example in the manner of a throttle. Alternatively, or in addition, the valve furthermore can completely stop the volume flow. The term "reversibly" in this context can be understood to mean that the valve can be closed and opened in a controllable manner. For this purpose, the at least one valve is preferably designed as a solenoid valve. In a further embodiment, the valve unit has a plurality of valves that are designed as solenoid valves.

In accordance with the invention, at least one isolating valve is provided in the first and/or second hydraulic line, via which the hydraulic line in question can be at least partially reversibly shut off. The at least one isolating valve can have the function of hydraulically decoupling the first and second brake circuit from one another. Thus, in a failure scenario, it is possible to selectively introduce pressure medium from the first pressure supply into one brake circuit or into both brake circuits. Furthermore, in the event of a failure of the first pressure supply, it is possible to select whether the pressure medium from the second pressure supply is to be introduced exclusively into one brake circuit or into both brake circuits.

An advantage of the brake system according to the invention can be seen in the more compact design and shape of the brake system compared with the brake systems according to the prior art. In particular, this advantage is achieved by the fact that an additional pressure supply unit and a tandem brake cylinder can be dispensed with compared to the prior art brake systems. Furthermore, a range of functions as well as fail-safety (specified by standards, for example) is guaranteed. Because the brake system is more compact, its field of use is advantageously optimized. The field of use is understood here to mean, for example, a local arrangement of the brake system, e.g., within a motor vehicle, and also a modular design of the brake system to meet different performance requirements for the brake system.

In one embodiment, the brake system consists of two hydraulic modules. Preferably, the modules are spatially separated, separate units and are connected via two hydraulic lines. The two hydraulic lines form the hydraulic interfaces. However, it is also possible to integrate both modules in one structural unit.

The first module (hereinafter also referred to as "X-Boost") can comprise the first pressure supply unit with the electromotive drive, the second pressure supply unit and a valve device. The second pressure supply unit can be embodied as a main brake cylinder with an actuation unit, in particular a brake pedal.

In one embodiment, the second module may comprise an electrically driven motor-pump unit (hereinafter also referred to as "ESP unit"). The motor-pump unit serves as a pressure supply and supplies pressure medium to at least one brake circuit, preferably both brake circuits.

The modules of the brake system according to the invention can be designed to implement the following functions:

First Module (X-Boost):
- brake boost with variable braking force amplification via evaluation of sensor technology of the actuation unit;
- blending during recuperation of braking energy by generator or electric drive motors in generator mode, optionally axle-specific blending when using several drive motors on front and rear axle;
- emergency braking function (AEB) with highly dynamic pressure build-up by the first pressure supply unit;

control of the variable air clearance of a frictionless brake;
driver assistance functions (DAS) such as automatic distance control;
secondary system or alternatively primary system for controlling the electric parking brake EPB for locking and unlocking;
secondary or primary system for yaw moment control (ESP, torque vectoring, steering interventions) through targeted brake-circuit-specific brake pressure generation; and/or
secondary or primary system for electric braking force distribution EBV.

Second Module (ESP Unit):
anti-lock braking system ABS;
anti-slip regulation ASR;
electric braking force distribution EBV;
yaw moment control (ESP function, torque vectoring, steering interventions) through targeted wheel-specific brake pressure generation;
braking force amplification as a primary system at higher pressures above the locking pressure, e.g., in the event of fading;
braking force amplification as a secondary system with variable braking force amplification by means of driver request recognition via evaluation of sensor technology of the actuation unit;
primary system or alternatively secondary system for controlling an electric parking brake EPB for locking and unlocking;
other functions implemented in ESP units.

The brake system is designed in particular as a brake system for a passenger vehicle. The pressure medium is preferably a brake fluid.

One component of an electromotive drive is known to be a motor sensor for electronic commutation and control of a position of a piston of the first pressure supply unit. The electromotive drive can be combined with various types of drive, e.g., via a transmission, in particular via a trapezoidal spindle or via a spindle of a ball screw drive.

In accordance with the invention, various sensor types can be used, such as segment sensors with inductive or magnetic-field-sensitive sensors, or sensors which are arranged in the motor or transmission shaft. These are particularly simple in design, typically have a target (two- or multi-pole magnet) and a magnetic-field-sensitive sensor element (Hall sensor, GMR, etc.). These sensors are electrically connected to a motor control unit, which is arranged on preferably the electromotive drive, sometimes via an intermediate housing. The sensor is preferably housed in a sensor housing on a sensor circuit board.

In one embodiment, the first isolating valve is embodied as a normally open isolating valve.

At least one second isolating valve can be arranged in the second hydraulic line. The second isolating valve enables the second hydraulic line to be reversibly interrupted in such a way that pressure medium from the first pressure supply can only enter the first brake circuit. From the point of view of the first pressure supply, it can be selected by means of the first and second isolating valves whether the pressure medium from the first pressure supply reaches a) exclusively the first brake circuit, b) exclusively the second brake circuit or c) both brake circuits.

The arrangement of the second isolating valve is particularly advantageous in conjunction with a third isolating valve. This third isolating valve can be arranged and designed in the first hydraulic line in such a way that, in a closed state of the third isolating valve, pressure medium from the second pressure supply passes exclusively into the second brake circuit. In accordance with the invention, the third isolating valve can thus be designed and arranged in such a way that it completely closes the supply into the first brake circuit, so that the second brake circuit can be supplied with pressure via the first and/or second pressure supply. At this juncture, it should be noted that the terms "first brake circuit" and "second brake circuit" are arbitrarily chosen. The second brake circuit can take the place of the first brake circuit and the first brake circuit can take the place of the second brake circuit.

In one embodiment, the second isolating valve is arranged such that a valve seat connection of the second isolating valve is hydraulically connected to the second brake circuit and/or the third isolating valve is arranged such that a valve seat connection of the third isolating valve (BP2) is hydraulically connected to the first brake circuit and/or the first isolating valve is arranged such that a valve seat connection of the first isolating valve is hydraulically connected to the second isolating valve and, via the/a fourth isolating valve, to the first pressure supply unit.

According to one aspect of the invention, the first isolating valve and/or the second isolating valve can be normally open valves.

The second pressure supply unit can include a main cylinder and a piston seated within the main cylinder.

The solution according to the invention provides a brake system that is optimized in terms of its overall volume and installation space. At the same time, flexibility with regard to a modular design of the brake system is advantageously optimized. In one embodiment, the modular design of the brake system is understood to mean a modular design of the brake system using components of different performance and/or a variation in an arrangement of a component within the brake system in order to meet different performance and installation space requirements for different motor vehicles.

In one embodiment, a travel simulator is provided that is hydraulically connected to the second pressure supply unit.

This embodiment is based on the idea that haptic feedback should be output to the driver by means of the travel simulator when the driver presses a brake pedal.

In a simplest embodiment, the travel simulator can be understood as a travel simulator cylinder with a travel simulator piston seated therein, which is spring-loaded by means of a spring element arranged between an inner wall and the travel simulator piston. The travel simulator cylinder is preferably connected to the second pressure supply unit by means of a hydraulic line. During actuation of the brake pedal, the travel simulator cylinder is also supplied with pressure medium so that the travel simulator piston is moved against the direction of the spring force of the spring element. Due to the progressive spring force, in one embodiment the driver feels an increasing pedal pressure, since the spring force of the spring element indirectly counteracts the force with which the driver actuates the brake pedal.

It is also advantageous if, in a further development, the travel simulator can be switched off by means of a switching valve and is not effective when the brake pedal is actuated along a first range and the brake pedal force is determined exclusively by a return spring. In this context, the first range is understood to mean, for example, a first half of a pedal travel after the start of an actuation during a braking operation. In other words, the first range corresponds, for example, to a (travel) range between a brake pedal that is not depressed and a brake pedal that is depressed halfway. In a second range, the brake pedal force is then determined by the return spring and travel simulator piston. The second range is understood here to be, for example, a second half of the pedal travel, i.e., the (travel) range between a brake pedal that is depressed halfway and a brake pedal that is fully depressed. In particular, the return spring in this case is not the spring element arranged inside the travel simulator cylinder. Rather, the return spring is an additional spring element which is preferably arranged, in particular attached, at one end to the travel simulator cylinder and at the other end to the travel simulator piston.

To further reduce the overall volume of the brake system, the return spring can alternatively be used in a flat part of the pedal travel characteristic—i.e., in the part in which a low return force acts on the brake pedal—so that the volume in the travel simulator is smaller and corresponds only to the progressive part of the characteristic, as also shown in WO2013/072198 of the applicant, to which reference is made here in this respect.

For further protection, the travel simulator may preferably comprise redundant seals. In accordance with the invention, a travel simulator shut-off valve can be provided. However, a travel simulator shut-off valve can also be dispensed with.

In one embodiment, the brake system comprises a fourth isolating valve, by means of which the first and second hydraulic lines can be (simultaneously) reversibly disconnected from the first pressure supply. The fourth isolating valve can be used to hydraulically isolate the brake circuits, in particular the first and second hydraulic line, from the first pressure supply in the event of a failure. This prevents the first pressure supply from receiving pressure medium that is not available for braking in the brake circuits. The fourth isolating valve can be designed to be normally closed.

In one embodiment, the first pressure supply has a self-locking transmission that avoids volume loss in said scenario.

Furthermore, the fourth isolating valve can be used to selectively supply volume from a storage container to one of the brake circuits as necessary. For this purpose, the first pressure supply draws in volume when the fourth isolating valve is closed.

The brake system can comprise at least one pressure relief valve for component protection. In one embodiment, the pressure relief valve can be in fluid connection to the first pressure supply unit, in particular its working chamber. Due to this overpressure protection, the first pressure supply unit may be designed for 80-100 bar. A stronger design would result in the first pressure supply having to be dimensioned significantly larger. The at least one pressure relief valve prevents the first pressure supply from being damaged during ABS operation, for example.

The isolating valves can be solenoid valves and/or two-way valves.

The first and/or second hydraulic line can be connected to the storage container via (their own) suction valves. These suction valves are used for the rapid replenishment of pressure media, for example when the motor-pump unit requires more volume. This can be particularly advantageous if the motor-pump unit is in stand-alone operation, i.e., the first pressure supply is not available for replenishing volume.

It is conceivable to operate the second pressure supply unit electromotively for redundancy purposes. In a preferred embodiment, the actuating element is arranged on the second pressure supply unit. The actuating element is, for example, the brake pedal already mentioned above in the explanations for the travel simulator, which can be actuated by a driver of the motor vehicle. In particular, the actuating element is arranged on the auxiliary piston of the second pressure supply unit. By means of the actuating element, the auxiliary piston can thus be actuated. In other words, when the actuating element designed as a brake pedal is actuated, the auxiliary piston is displaced into the main brake cylinder in such a way that the pressure medium is pressed out of the main brake cylinder and thus out of the second pressure supply unit.

In one embodiment, the second pressure supply unit comprises a (single) main brake cylinder or cylinder with a single piston actuatable by means of the actuating element. The second pressure supply thus preferably comprises a "single piston cylinder" with only a single working chamber in which a single piston is held.

In one embodiment, the second pressure supply unit and/or the travel simulator each have two sealing elements that are designed redundantly. Redundant" in this context is understood to mean that each of the two sealing elements ensures the tightness of its corresponding component and thus its functionality in the event of a failure of the other sealing element. The sealing elements are preferably designed here as ring seals.

In accordance with the invention, all functionally important seals can be designed redundantly. Leaks can be detected during a braking process, for example, as part of a diagnosis. This achieves a high safety level for "fail operational".

In one embodiment, a storage container or reservoir is provided to hold the pressure medium. The storage container is hydraulically connected to the first pressure supply unit and to the second pressure supply unit by means of hydraulic lines. In one embodiment, the storage container is additionally also connected to the first hydraulic line and to the second hydraulic line via one further hydraulic line each. All or some of the hydraulic lines to the storage container can comprise suction valves.

In one embodiment, the storage container additionally has a sensor element, in particular a level sensor, which is designed to detect a fill level of the pressure medium inside the storage container. The level sensor can have a float, which is arranged in the storage container inside the pressure medium, i.e. "floats" in the pressure medium and generates a sensor signal as a function of the fill level of the pressure medium or causes a change in a (permanent) sensor signal when the fill level of the pressure medium changes.

In one embodiment, the position of the float can be detected wirelessly. For example, the float may comprise a magnet, the position of which is detectable on the basis of its magnetic field. The associated sensor means comprises, for example, one or more magnetic field sensors arranged on a circuit board or circuit board immediately adjacent to the storage container. In one embodiment, the circuit board is the PCB.

According to one embodiment, the electromotive drive has a redundant 3-phase electrical connection. The electromotive drive is controlled via this. The drive can be controlled according to one of the methods known from the prior art.

Due to the 2×3 phase connection of the motor of the first pressure supply unit, pressure can still be built up with 50% of the torque even in the event of partial motor failure. This allows a brake pressure of up to 40-50 bar to be generated, which ensures safe braking of the vehicle even in the event of this partial failure.

In one embodiment, elastic elements, in particular spring elements, are provided on the wheel brakes for pad return of the wheel brakes. Preferably, the spring elements or elastic elements act in such a way that the brake pads lift off the brake disc (air clearance) as soon as pressure is no longer built up in the brake circuit. The spring element can be a (strong) rollback seal of the wheel brake. This has the advantage that there is no backlash on the brake pedal.

The typical friction loss due to brake pads in contact with the disc brakes is 100-300 watts for production brake systems and has a significant impact on the range or battery capacity for electric vehicles. Since battery cost is a very large cost factor in all-electric vehicles, frictionless braking has a very large impact on the overall cost of a vehicle. A frictionless or low-friction brake can be made possible, for example, by a strong rollback seal in the brake pads. The air clearance varies with brake pad wear and increases as operating time increases.

As explained, the invention achieves a compact design of the brake system and, in particular, of the brake booster with a small overall volume, which is very short and narrow and has redundancies, e.g., for pressure generation, electrical supply and failure of the pump motor of the ABS/ESP unit. Furthermore, even in the event of failure of the ESP unit, an ABS function can be enabled with reduced performance. In emergency operation without ESP, the ABS function thus represents at least an axle-by-axle individual control for improving the braking distance ("select low" pressure control).

In one embodiment, the first pressure supply unit is arranged with a first piston cylinder unit, and the second pressure supply unit is arranged with a second piston cylinder unit in a housing such that a longitudinal axis of the first piston cylinder unit is substantially perpendicular to a longitudinal axis of the second piston cylinder unit. The longitudinal axes can be arranged on two adjacent planes. By this arrangement, a very compact first module can be produced. In accordance with the invention, a substantially perpendicular arrangement can be an arrangement in which the axes deviate by a maximum of ±15° compared to the 90° angle. Preferably, the arrangement of the piston cylinder units is such that they are hydraulically separated from each other.

The object mentioned at the outset is also solved by a method for controlling a brake system. The brake system can be one of the brake systems as already explained above. The method can comprise the following steps:
a) providing a first pressure at a first connection point for connection to a first brake circuit;
b) providing a second pressure at a second connection point for connection to a second brake circuit;
c) detecting a fault condition, in particular the loss of pressure medium and/or the failure of a pressure supply;
d) closing at least a first isolating valve in response to the detection of the fault condition, such that a first pressure supply unit is hydraulically decoupled from the first connection point.

There are similar advantages to those already discussed in conjunction with the device.

The method may comprise the step of opening a feed valve such that the first connection point is in fluid connection to a second pressure supply unit. The opening of the supply valve may also be in response to the detection of a fault condition.

BRIEF DESCRIPTION OF THE DRAWINGS

The foregoing summary, as well as the following detailed description of the preferred invention, will be better understood when read in conjunction with the appended drawings.

DETAILED DESCRIPTION OF THE INVENTION

Figure 1:
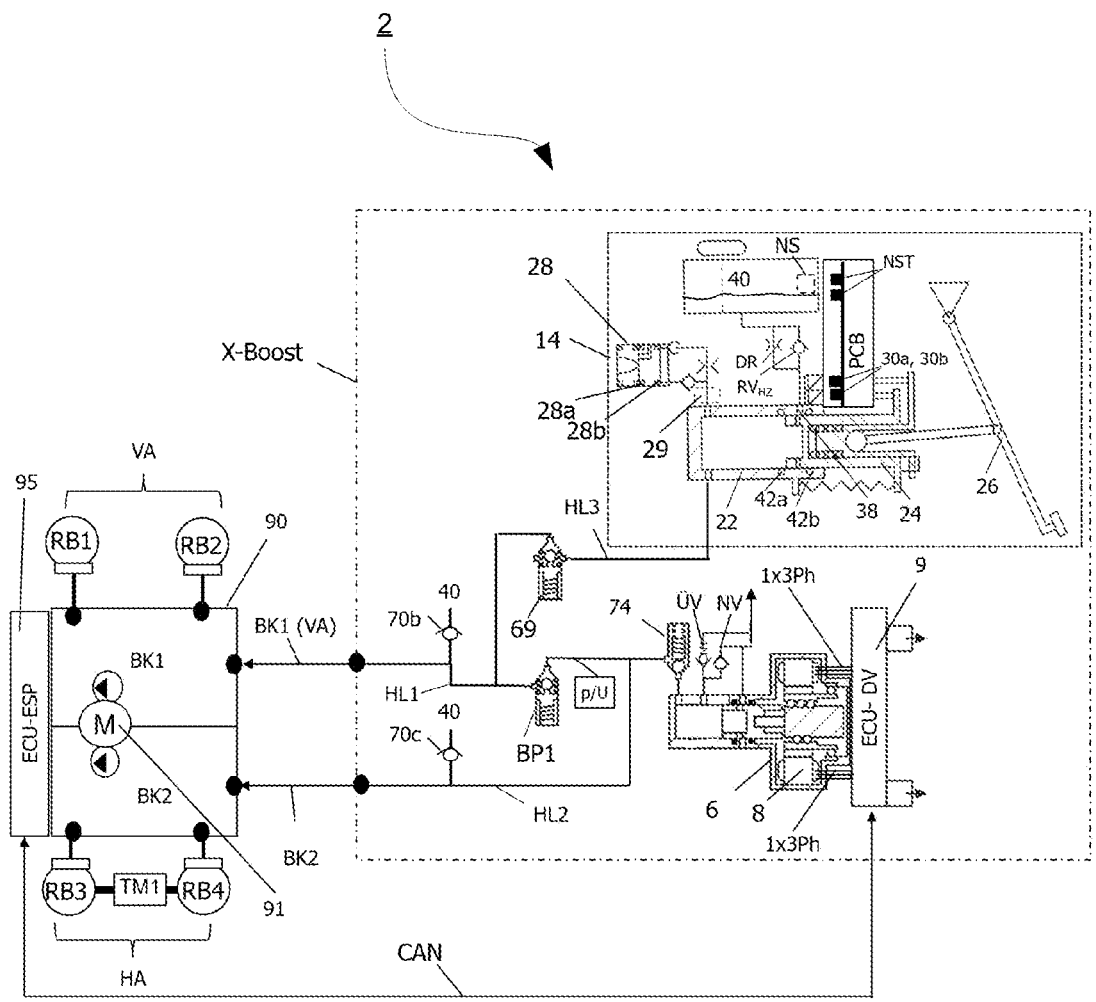
FIG. 1 is a schematic circuit diagram of a first exemplary embodiment of the brake system according to the invention with two isolating valves and one feed valve.

FIG. 1 shows a schematic circuit diagram of a brake system 2 comprising a first module (referred to as X-Boost) and a second module. The first module—the X-Boost—has a first pressure supply unit 6 with an electromotive drive 8 as well as a second pressure supply unit 14 with a main brake cylinder 22 and an actuating element 26 with a brake pedal. Furthermore, a valve device with various solenoid and check valves is provided.

The second module comprises an electrically driven motor-pump unit 90 (also referred to as an ESP unit) having a pump with an electromotive drive 91—also referred to as a third pressure supply unit. The motor-pump unit 90 may be any ESP unit. A suitable ESP unit is described in detail in DE 10 2014 205 645 A1. Alternatively, a standard ABS unit without ESP function can be used as the second module.

The two modules (X-boost and ESP unit) are set up to supply pressure medium to two brake circuits BK1 and BK2, wherein the modules are preferably connected hydraulically in series. In one exemplary embodiment, the X-Boost is attached to the bulkhead of a vehicle, to which the second module (ESP unit) is connected via hydraulic lines at two hydraulic interfaces or connection points (see thick black dots in FIG. 1 in relation to BK1, BK2).

The first pressure supply unit 6 is connected to the first brake circuit BK1 or the corresponding interface via a first hydraulic line HL1. Furthermore, a second hydraulic line HL2 is provided for connecting the first pressure supply unit to the second brake circuit or the corresponding interface.

In accordance with the invention, the second pressure supply unit 14 of the X-Boost has only one main brake cylinder 22 with a piston 24 and a piston chamber 23. In the exemplary embodiment, the second pressure supply unit 14 is of single-circuit design and is connected to the brake circuit BK1 or the corresponding hydraulic interface via a third hydraulic line HL3 and a feed valve 69. A fluid connection to the second hydraulic line HL2 leads via a first isolating valve BP1. The second pressure supply unit 14 can be disconnected from the brake circuits BK1, BK2 by closing the feed valve 69 in such a way that in normal brake-by-wire operation without faults (e.g., without brake circuit failure) the actuating unit 26 acts only on a travel simulator 28.

In the exemplary embodiment according to FIG. 1, the brake circuits BK1 and BK2 can be isolated via the first isolating valve BP1 (preferably normally open). In accordance with the invention, in the event of a failure of the first pressure supply unit 6, the main brake cylinder 22 of the second pressure supply unit 14 can thus be connected either to the first brake circuit BK1 only or to the first and second brake circuits BK1, BK2 by opening the first isolating valve BP1. For this emergency operation, the feed valve 69 is designed as a normally open valve. If current is still applied, the valve is opened so that the second pressure supply unit 14 is no longer hydraulically decoupled from the brake circuits BK1, BK2.

The first pressure supply unit 6 also optionally acts on the second brake circuit BK2 (first isolating valve BP1 closed) or both brake circuits BK1, BK2 (first isolating valve BP1 open or normally open). In normal operation, the first isolating valve BP1 is open so that the first pressure supply unit 6 supplies both brake circuits BK1, BK2 with pressure and the second pressure supply unit 14 is decoupled from the first brake circuit BK1 by the closed feed valve 69. If it is determined that volume is being lost from the brake circuits BK1, BK2, the brake circuit BK1 can be decoupled from the first pressure supply unit 6 by means of the first isolating valve BP1, so that in the event of a leak in the first brake circuit BK1, the second brake circuit BK2 can continue to be operated without loss of hydraulic medium.

In the exemplary embodiment, the first isolating valve BP1 is embodied as a solenoid valve, wherein the ball seat of the isolating valve BP1 is connected via a connection (valve seat connection) to the portion of the hydraulic line that leads to the first pressure supply unit 6. This means that the first isolating valve BP1 can be reliably closed by energization even in the event of failure of the first brake circuit BK1 and is not forced open by higher pressures during operation of the first pressure supply unit 6.

The second pressure supply unit 14 feeds the travel simulator 28 via an expansion hole in a wall of the main cylinder 22 when the actuating element 26 is actuated, so that a progressive haptic resistance in the form of a return force can be felt as a function of a magnitude of the actuation of the actuating element 26. The magnitude of actuation in this context is understood to be how "firmly and/or how far" a driver actuates the actuating element 26, which is configured as a brake pedal, and thus pushes the piston 24 into the main brake cylinder 22. Progressive haptic resistance is also referred to as pedal characteristic.

A travel simulator valve 29 may be provided to shut off the connection to the travel simulator 28 (indicated in FIG. 1).

The second pressure supply unit 14 has at least one expansion bore 38, which is connected to a storage container 40 via hydraulic lines. The storage container 40 is also part of the brake system 2.

In the exemplary embodiment, a check valve RVHZ as well as a throttle DR may be arranged in the hydraulic line between the expansion bore and the storage container 40. By means of this check valve RVHZ as well as the first pressure supply unit 6, it is possible to perform a diagnosis of a state of preservation of sealing elements arranged within the first pressure supply unit 6 as well as within the travel simulator 28. When testing the seal of the main brake cylinder 22, the travel simulator valve 29—if present—can be closed.

As shown, the main brake cylinder 22 has two sealing elements 42a, 42b, which are ring seals. The expansion bore 38 is arranged between the two sealing elements 42a, 42b. A throttle DR is arranged in the connection between the expansion bore 38, which is arranged between the two sealing elements 42a, 42b, and the storage container 40.

The flow rate of the throttle DR is dimensioned so that the pedal characteristic is not significantly changed if the sealing element 42a fails (3 mm pedal travel in 10 s). In addition, a temperature-related volume compensation of the pressure medium can take place via the throttle DR.

During ABS operation of the motor-pump unit 90, high pressure peaks can occur in the brake circuits BK1 and BK2, which can place a considerable load on the first pressure supply 6. A pressure relief valve ÜV is connected to the piston chamber of the first pressure supply unit 6 via a bore in the variant according to FIG. 1, so that the high pressure peaks are reduced and damage to the system is avoided.

A suction valve NV is also in fluid connection to the piston chamber of the first pressure supply unit 6 and enables the replenishment of pressure medium from the storage container 40. Thus, the first pressure supply unit 6 can independently introduce additional pressure medium into the brake circuits BK1, BK2. An additional expansion hole provided in the cylinder of the first pressure supply unit 6 enables volume compensation in the initial position of the piston of the first pressure supply unit 6.

The motor-pump unit 90 is shown only schematically in FIG. 1. It ultimately supplies four wheel brakes RB1, RB2, RB3 and RB4. In the schematic diagram, the wheel brakes RB1, RB2 serve a front axle VA of the vehicle and the wheel brakes RB3 and RB4 serve a rear axle HA of the vehicle. A drive electric motor is located on the rear axle HA of the vehicle to drive the vehicle. The vehicle may be an all-electric vehicle or a hybrid vehicle.

The first brake circuit BK1 is connected to the wheel brakes RB1 and RB2, and the second brake circuit BK2 is connected to the wheel brakes RB3 and RB4. For the hydraulic arrangement shown in FIG. 1, a corresponding assignment is advantageous.

The motor-pump unit 90 further also includes a control unit 95 ("ECU-ESP").

Similarly, the second pressure supply unit 14 has a circuit board or PCB, which includes a level sensor NST that detects the position of a magnetic float NS within the storage container 40. The PCB further has sensors 30a, 30b for detecting pedal travel and a travel difference between the piston 24 and the pedal travel.

To provide additional pressure medium for the motor-pump unit, a suction valve 70b is provided in the first brake circuit BK1 and connects the pump of the motor-pump unit 90 to the storage container 40.

If the pump of the motor-pump unit 90 requires pressure medium for the second brake circuit BK2, this can be supplied from the storage container 40 via the suction valve 70c.

Thus, the two brake circuits BK1, BK2 are each connected to the storage container 40 by their respective hydraulic lines HL1, HL2 via a suction valve 70b or 70c respectively for sucking in pressure medium. To achieve optimum suction of the pressure medium, the suction valve 70c preferably has a diameter in the range from 30 mm to 50 mm and in particular a diameter of 40 mm.

Optionally, the exemplary embodiment has a control of the air clearance between brake pads and disc brake. The wheel brakes RB1, RB2, RB3, RB4 (see FIG. 1) can be designed as frictionless wheel brakes RB1, RB2, RB3, RB4. In a brake-by-wire system, disc brakes with brake pads that are spaced apart with an air clearance without pressure in the brake system allow the friction resistance to be reduced. This can be achieved by using rollback seals, return springs or by actively retracting the brake pads by generating negative pressure. Document EP 2225133 A2 describes the possibility of generating a corresponding negative pressure by means of the first pressure supply unit 6 and is hereby explicitly incorporated in respect of this disclosure.

The first pressure supply unit 6 can be used to measure the air clearance in the wheel brake RB1, RB2, RB3, RB4, which varies during operation, on a wheel-specific or brake circuit-specific basis by evaluating the pressure profile. In accordance with the invention, a corresponding measurement can be carried out during servicing, but also during operation of the vehicle. Preferably, the measurement is carried out when the vehicle is stationary or after braking.

With the known air clearance values of the wheel brakes RB1, RB2, RB3, RB4, the air clearance is then first quickly overcome by means of a piston travel control of the first pressure supply unit 6 when the wheel brake RB1, RB2, RB3, RB4 is activated. In this respect, the use of a brushless motor as the electromotive drive 8 of the first pressure supply unit 6 with a small time constant is preferable, since the overcoming of the air clearance can be realized without the driver noticing this when the brake is applied.

In addition, the brake system 2 can be controlled so that the vehicle electric motor TM1 acts in the phase of the air clearance. Thus, a braking effect is generated immediately when the brake is applied.

In one exemplary embodiment of the invention, differences in the air clearances of the wheel brakes RB1, RB2, RB3, RB4 are compensated for by controlling inlet valves of the second module (ESP unit) and/or using the electric motor of one or more vehicle axles to generate a braking effect to start braking. The air clearance can generally be used to reduce or avoid stick-slip effects of new brake systems at low speeds.

In one exemplary embodiment, the brake system 2 according to the invention implements a stutter braking in the event of a failure of the ESP unit. By moving the piston of the first pressure supply unit 6 back and forth between an upper and lower pressure range, wheel locking is avoided and steerability is maintained.

In one exemplary embodiment, 1-channel ABS operation is implemented additionally or alternatively. For this purpose, measurement signals such as pressure and wheel speeds can be read in via an interface to the control unit 95 of the ESP unit.

The automated stutter braking results in sufficient braking distances (approximately 200% of the braking distance with ABS compared with full wheel-specific ABS) and acceptable stability by maintaining steerability. In conventional brake systems (WO 2011/098178) that offer this emergency function, actuation of the pedal can cause the wheels to lock because actuation via the brake pedal acts directly on the piston of the main brake cylinder, which is moved back and forth during the stutter braking function.

The brake system according to the invention can provide this emergency function without the disadvantages of conventional systems, since the brake pedal according to one aspect of the invention acts only on piston 24 and is isolated from the brake circuits BK1, BK2 via the feed valve 69. Thus, in the brake system according to the invention, the function of the automated stutter braking cannot be disturbed by the driver.

As an alternative or in addition to the stutter braking, single-channel ABS operation with select low control can be implemented. This leads to a further deterioration of the braking distance (approximately 400% braking distance compared to the braking distance with a full wheel-specific ABS), but to unrestricted vehicle stability. In accordance with the invention, measured values, e.g. pressure and wheel speed, for 1-channel ABS operation can be read in by the ESP unit 95 via an interface, e.g., CAN interface.

To further increase the availability of the brake system 2 according to the invention as shown in FIG. 1, the electromotive drive 8 of the first pressure supply unit 6 is connected to the control unit 9 (ECU DV) of the X-boost via two redundant three-phase strings, and the electronics are (partially) redundant. For example, two B6 bridges can be provided for each string. Furthermore, in at least one exemplary embodiment, the electronics are connected to two redundant power supplies. In this way, the probability of failure of the electromotive drive 8 can be reduced by a factor of 4-10 and the fault condition (failure of the first pressure supply unit 6) can be further significantly reduced.

The control unit of the ESP unit 95 and the control unit 9 (ECU DV) of the X booster are communicatively connected to one another via a CAN bus CAN. In this respect, it is possible to send control commands to the motor-pump unit 90 which cause actuation of the drive 91 and/or the valves provided (see also FIG. 6).

With the brake system 2 according to FIG. 1, the following safety-relevant redundancies can be realized:
  ensuring sufficient braking effect to meet legal requirements in the event of brake circuit failure, failure of a) the second pressure supply unit 14, b) the first pressure supply unit 6 or c) first pressure supply unit 6 and the third pressure supply unit (simultaneously), i.e. also meeting legal requirements in the event of double failures:
    fault condition 1—failure of the third pressure supply unit (motor-pump unit 90): deceleration due to brake boost via the first pressure supply unit 6 in both brake circuits BK1, BK2;
    fault condition 2—failure of third pressure supply unit and brake circuit BK1: deceleration due to brake boost via first pressure supply unit 6, e.g., at rear axle;
    fault condition 3—failure of the third pressure supply unit and the second brake circuit BK2: deceleration due to second pressure supply unit 14, e.g., at the front axle (first isolating valve BP1 closed)
    fault condition 4—failure of the first pressure supply unit 6: deceleration due to brake boost via the third pressure supply unit;
    fault condition 5—failure of the first pressure supply unit 6 and the first brake circuit BK1 or the second brake circuit BK2: deceleration by brake boost via the third pressure supply unit in one of the brake circuits BK1, BK2, possibly supported by vehicle electric motor TM1 on one axle;
    fault condition 6—failure of the first pressure supply unit 6 and the third pressure supply unit: braking by main brake cylinder on front axle VA and optionally by drive electric motor on rear axle HA;
    fault condition 7—failure of the vehicle electrical system: braking by second pressure supply unit 14 if necessary on front axle VA and rear axle HA;
  electronic braking force distribution (EBV) in the event of failure of the ESP unit by generating pressure in the first brake circuit BK1 via the third pressure supply unit and generating pressure in the second brake circuit BK2 via the first pressure supply unit 6 with the first isolating valve BP1 closed and controlling the first pressure supply unit 6 via sensors of the second pressure supply unit 14. This requires an S/W brake circuit split, i.e. the wheels of the front axle VA are connected to the first brake circuit BK1 and the wheels of the rear axle HA to the second brake circuit BK2;
  control of the air clearance between brake pads and disc brake;
  1-channel ABS operation or realization of automated stutter braking.

Figure 2:
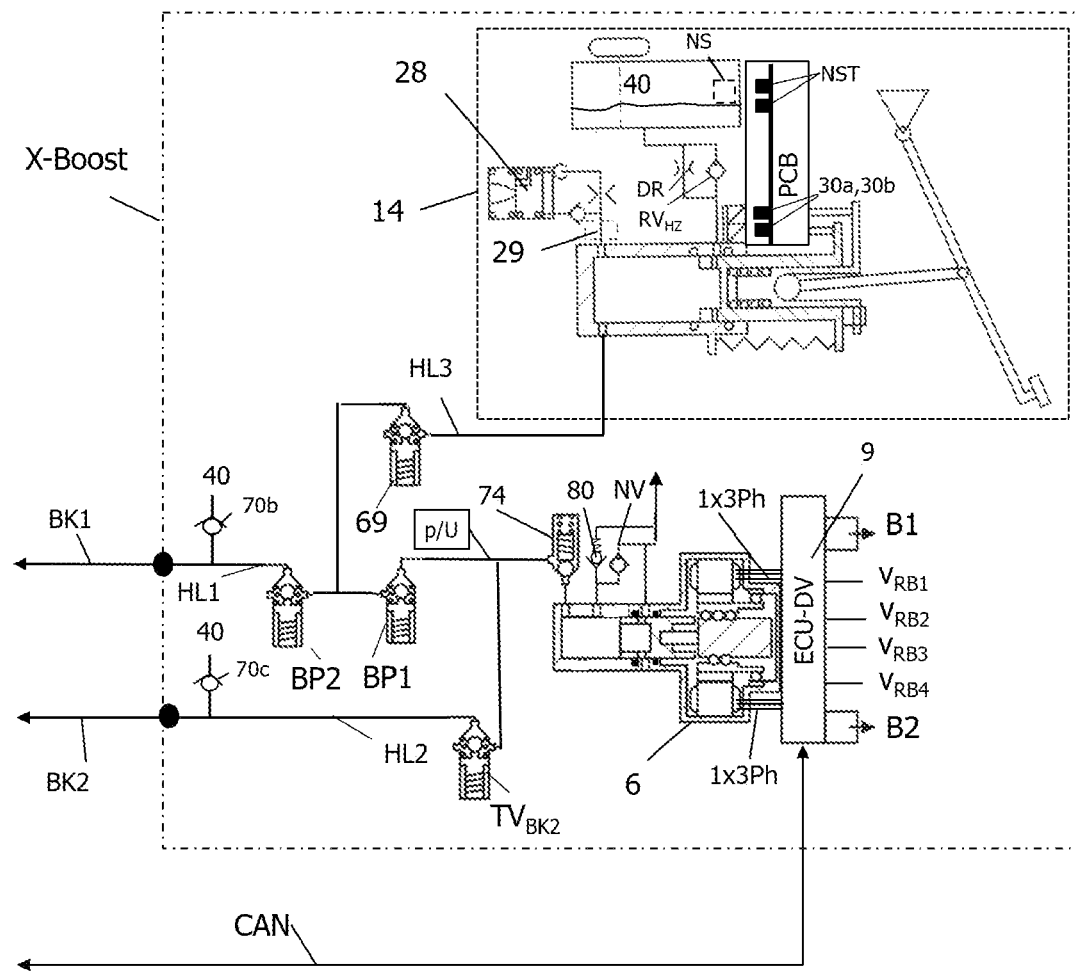
FIG. 2 is a schematic circuit diagram of a second exemplary embodiment of the brake system according to the invention with four isolating valves and one feed valve.

FIG. 2 shows an alternative embodiment of the X-booster according to FIG. 1. In contrast to the exemplary embodiment according to FIG. 1, a second isolating valve TVBK2 is provided in the second hydraulic line HL2 in FIG. 2. This second isolating valve TVBK2 enables the second brake circuit BK2 to be hydraulically decoupled from the first pressure supply 6. Thus, the first pressure supply 6 can selectively provide pressure medium in the first brake circuit BK1 or in the second brake circuit BK2 or in both brake circuits. When volume loss is detected in the second brake circuit BK2, this can be decoupled.

Furthermore, the exemplary embodiment according to FIG. 2 differs in that a third isolating valve BP2 is provided in the first hydraulic line between the first isolating valve BP1 and the connection point for the first brake circuit BK1. Preferably, this third isolating valve BP2 is arranged such that the third hydraulic line opens into the first hydraulic line HL1 in a hydraulic connection between the first isolating valve BP1 and the third isolating valve BP2. The third isolating valve BP2 makes it possible to decouple the first brake circuit BK1 hydraulically from both the first pressure supply unit 6 and the second pressure supply unit 14. Thus, when the first pressure supply unit 6 fails, it is possible to feed pressure medium into the second brake circuit from the second pressure supply unit 14 via the feed valve 69, the first isolating valve BP1 and the second isolating valve TVBK2. If the third isolating valve BP2 is closed, no pressure medium is supplied to the first brake circuit.

With the brake system 2 according to FIG. 2, the following safety-related redundancies can be realized:
  ensuring a sufficient braking effect in the event of failure of the one or more pressure supply units,
    fault conditions 1-7: see embodiment 1;
    fault condition 8—failure of the feed valve 69 (e.g., leaking) or failure of the electrical control: closure of third hydraulic line HL3 by the isolating valves BP1 and BP2 so that the travel simulator is fully effective; first pressure supply unit 6 and ESP unit set pressures in the wheel brakes;
    further degree of freedom: optional feeding of the pressure of the main brake cylinder into brake circuit BK1 or BK2 in the event of a brake circuit failure.
  electronic brake boost (EBV) in the event of failure of the ESP unit by generating pressure in brake circuit BK1 via the second pressure supply unit 14 and by generating pressure in brake circuit BK2 via the first pressure supply unit 6 when the first isolating valve BP1 is closed and by controlling the pressure supply via the sensor system of the second pressure supply unit 14. S/W brake circuit distribution is required for this purpose and the braking force distribution in the brake circuits is controlled via the isolating valves BP1, BP2 and TVBK2. In accordance with the invention, the piston of the first pressure supply unit 6 can be controlled in forward and return stroke motion to apply a suitable pressure. Optionally, pressure adjustment can be performed via PWM control of the valves, in particular the isolating valves;
  2-channel ABS operation in which, depending on road conditions, the system switches between a "select low" control (wheel lock pressure of the wheel with the poorer adhesion conditions per brake circuit determines the pressure to be set) and a "select high" control (wheel lock pressure of the wheel with the better adhesion conditions per brake circuit determines the pressure to be set).

air clearance control is already implemented in the exemplary embodiment according to FIG. 1. The exemplary embodiment according to FIG. 2 offers the additional potential to compensate for the unequal air clearance in the wheel brakes RB1, RB2, RB3, RB4 of the brake circuits BK1, BK2 by appropriate preliminary control before the brake booster operation by sequential opening of the isolating valves BP1, TVBK2. Alternatively, PWM operation can also be used so that different flow cross-sections to the brake circuits BK1, BK2 can be set and thus the unequal air clearance can be compensated for simultaneously. An S/W brake circuit split is suitable here. This method is easy to implement because the brake circuit isolating valves are part of the X-Boost module and can be implemented without any time delay or susceptibility to errors (e.g., use of an interface between X-Boost and ESP unit). For example, the brake system can be designed in such a way that no air clearance is provided at the brake pads on the front axle and air clearance is provided on the rear axle. Thus, even a failure of the first pressure supply unit 6 does not lead to a delay in braking when pressure is generated by the actuation unit and acts on the wheel brakes RB1, RB2, RB3, RB4 of the front axle VA in accordance with the invention. In addition, a greater braking effect can be generated with the front axle VA.

Figure 3:
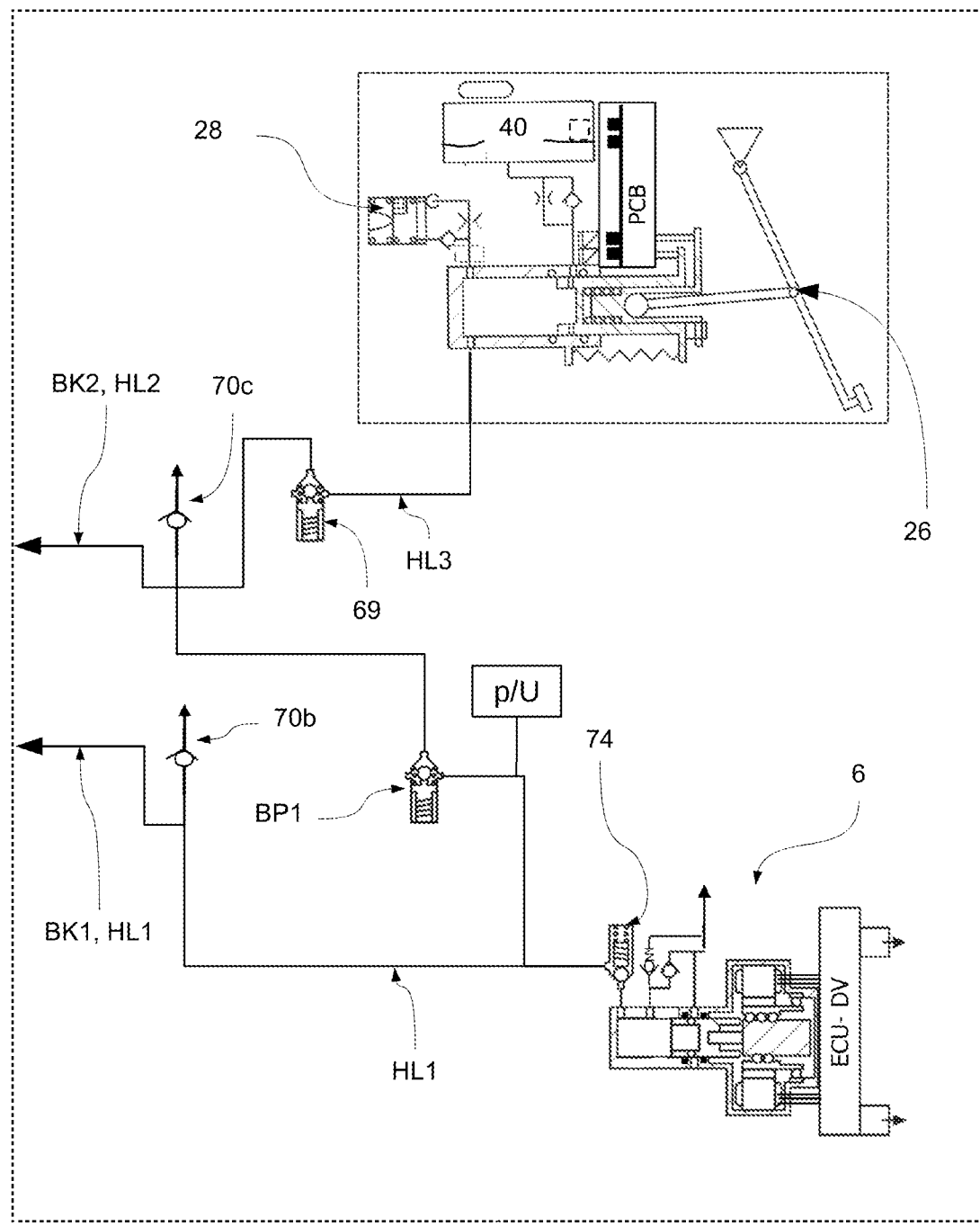
FIG. 3 is a schematic circuit diagram of a variation of the first exemplary embodiment.

FIG. 3 shows a variation of the exemplary embodiment according to FIG. 1. Here, the brake circuits are swapped. It should be obvious to a person skilled in the art that similar advantages to those already explained in conjunction with the exemplary embodiments for FIGS. 1 and 2 can be achieved with a corresponding modification of the invention.

Figure 4:
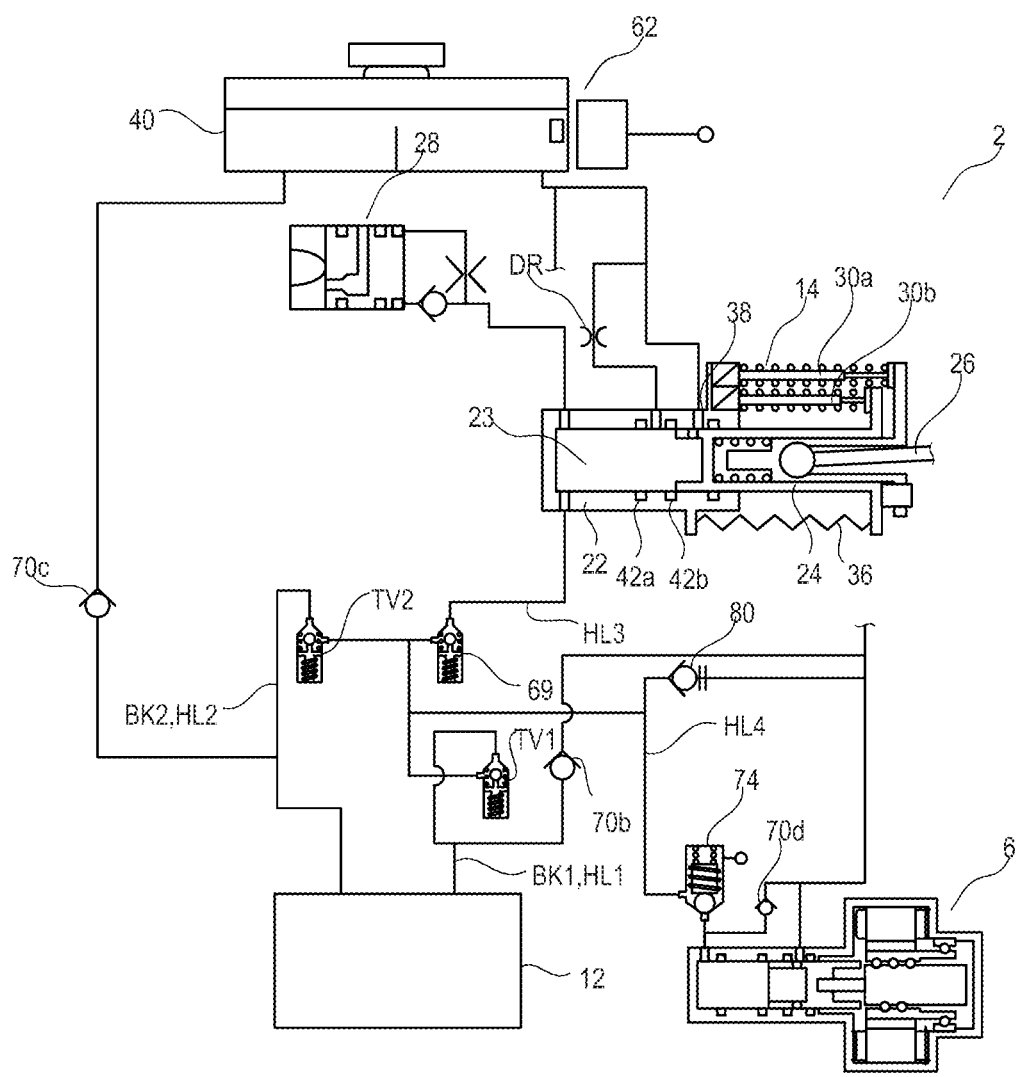
FIG. 4 is a schematic circuit diagram of a further exemplary embodiment of the brake system according to the invention.

FIG. 4 shows a schematic circuit diagram of a further exemplary embodiment of the inventive brake system 2 with the first pressure supply unit 6, which has an electromotive drive 8 and a transmission, and with a motor-pump unit 90, shown in FIG. 4 only schematized by a rectangle.

The brake system 2 further comprises a second pressure supply unit 14. The second pressure supply unit 14 is described in detail in the application with the application file number PCT/EP2018/072363 of the applicant, to which reference is made at this juncture.

Similarly to the exemplary embodiment according to FIG. 1, the second pressure supply unit 14 has a main brake cylinder 22 and a piston 24. An actuating element 26 is arranged on the piston 24 and is only partially shown in FIG. 4 and is designed, for example, as a brake pedal.

In addition, the brake system 2 shown in FIG. 4 has a travel simulator 28 that is hydraulically connected to the second pressure supply unit 14.

Sensors 30a, 30b detect a brake pedal travel and a travel difference between actuating element 26 and piston 24. The actuating element 26 acts on the piston 24 via a spring element. The sensors 30a, 30b are preferably integrated in the second pressure supply unit 14 and are part of a pedal interface there that is not described in more detail here.

The signal generated by the sensors 30a, 30b contains information about a differential travel and thus a control signal for the first pressure supply unit 6, so that the latter applies a pressure medium to the first brake circuit BK1 and the second brake circuit BK2 as a function of the signal generated by the sensors 30a, 30b. Alternatively or additionally, the two brake circuits BK1, BK2 are supplied with the pressure medium located inside the main brake cylinder 22. Thus, in the exemplary embodiment, the second pressure supply unit 14 is set up in such a way that the two brake circuits BK1, BK2 are at least indirectly supplied with the pressure medium.

Furthermore, when the actuating element 26 is actuated, the second pressure supply unit 14 feeds the travel simulator 28 via an expansion hole in a wall of the main brake cylinder 22, so that a progressive haptic resistance in the form of a return force can be felt as a function of a magnitude of the actuation of the actuating element 26. The magnitude of actuation in this context is understood to be how "firmly and/or how far" a driver actuates the actuating element 26, which is in the form of a brake pedal, and thus pushes the piston 24 into the main brake cylinder 22. Progressive haptic resistance is also referred to as pedal characteristic.

Furthermore, the second pressure supply unit 14 comprises a spring 36, which is arranged with one end on the piston 24 and with the other end on the main brake cylinder 22. The spring 36 may also be part of the spring characteristic of the travel simulator 28 and thus part of the pedal characteristic.

The second pressure supply unit 14 has at least one, in the exemplary embodiment two, expansion bores 38, which are connected to a storage container 40 via hydraulic lines. The storage container 40 is also part of the brake system 2 in the exemplary embodiment according to FIG. 4.

In one embodiment, a check valve RV (not shown) may be arranged in the hydraulic line between the expansion bore 38 and the storage container 40. Furthermore, such a check valve RV (not shown) can also be arranged in a hydraulic line between the first pressure supply unit 6 and the storage container 40. By means of this check valve RV as well as the first pressure supply unit 6, it is possible to perform a diagnosis of a state of preservation of sealing elements arranged within the first pressure supply unit 6 as well as within the travel simulator 28.

Furthermore, the main brake cylinder 22 has two sealing elements 42a, 42b that are redundant to each other and are designed as ring seals. One of the two expansion bores 38 is arranged between the two sealing elements 42a, 42b. A throttle DR is arranged in the connection between the expansion bore 38, which is arranged between the two sealing elements 42a, 42b, and the storage container 40.

The throttle DR is dimensioned in respect of its flow rate so that the pedal characteristic is not significantly changed in the event of failure of one of the two sealing elements 42a, 42b (3 mm pedal travel in 10 s). In addition, a temperature-related volume compensation of the pressure medium can take place via the throttle DR.

In the exemplary embodiment according to FIG. 4, as in FIGS. 1 and 2, the brake system 2 is designed redundantly with regard to a failure of the first pressure supply unit 6. For this purpose, in the event of failure of the first pressure supply unit 6 for a braking process, the ABS/ESP unit 90 takes over in such a way that it sucks in pressure medium from the storage container 40 by means of the pump P and supplies it to the brake circuits BK1 and BK2. In other words, the pump P of the ABS/ESP unit 90 assumes the function of the brake booster at least as an alternative in the event of failure of the first pressure supply unit 6. For this purpose, the hydraulic lines HL1 and HL2 are each hydraulically connected to the storage container 40 via a hydraulic line.

The first pressure supply unit 6 has a piston 44, which has an expansion hole 46. The pressure medium is drawn in via a hydraulic line by means of which the first pressure supply unit 6 is connected to the storage container 40 (only partially shown in FIG. 4).

The dimensioning of the first pressure supply unit 6 can be staggered in such a way that one full stroke of the piston 44 corresponds to a volume intake of one of the two brake circuits BK1, BK2.

In turn, the first pressure supply unit 6 can alternatively be made correspondingly or smaller in volume (piston and stroke).

A pressure build-up and/or pressure reduction in the first brake circuit BK1 and second brake circuit BK2 takes place via a control unit 9, to which the signal of the pedal travel sensors 30a, 30b is transmitted and then the electromotive drive 8 is controlled by the control unit 9 as a function of the transmitted signal. For receiving the signal of the pedal travel sensors 30a, 30b, the control unit has signal inputs (not shown). Furthermore, the control unit has two connections (also not shown) for electrical supply to a connection to a vehicle electrical system of the motor vehicle.

Normally, the first pressure supply unit 6 delivers a volume with a pressure in the range of 80 bar to 120 bar to the brake circuits BK1 and BK2. This pressure range substantially corresponds to a wheel lock limit. That is to say, at a higher pressure the wheels would lock. If a higher pressure is nevertheless required, pump P of ABS/ESP unit 90 is switched on and a pressure build-up to approximately 200 bar is generated. However, this increased pressure build-up takes place with correspondingly lower power and is therefore slower than the pressure build-up with the first pressure supply unit 6. This is permissible because the pressure build-up up to 200 bar is only relevant for fading cases and does not have to take place as quickly as the pressure build-up up to the locking limit (e.g., for implementing emergency braking functions). The pump P of the ABS/ESP unit 90 is thus preferably designed for 200 bar, and the first pressure supply unit 6 is preferably designed for 80-120 bar.

If the first pressure supply unit 6 fails during a braking process, the piston 44 is pushed back under pressure so that the braking pressure can be completely reduced. If a self-locking transmission is used for the piston 44 (e.g. in the form of a trapezoidal spindle with plastic nut), such a pressure reduction is not possible. In this case, a normally closed solenoid valve is provided in the first brake circuit BK1 with connection to the storage container (not shown).

Furthermore, the brake system 2 has a valve unit 50 which is arranged and, in particular, connected by means of hydraulic lines between the second pressure supply unit 14 and the ABS/ESP unit to the motor-pump unit 90. Furthermore, the first pressure supply unit 6 is connected to the valve unit 50. Thus, the valve unit 50 acts in the manner of a distributor and enables the flow paths of the pressure medium already described above. The valve unit 50 also has check valves (not shown here for reasons of simplification) and pressure sensors.

The auxiliary piston chamber 23 of the second pressure supply unit 14 is connected to the motor-pump unit 90 by means of a hydraulic supply line HL3 via the valve 69. Specifically, downstream of the valve 69, a first hydraulic line HL1 and a second hydraulic line HL2 are provided, which are connected in parallel with each other and are connected to the motor-pump unit 12. In other words, the hydraulic supply line HL3 downstream of the valve 69 splits into the first hydraulic line HL1 (which forms part of the first brake circuit BK1) and the second hydraulic line HL2 (which forms part of the second brake circuit BK2). Furthermore, a valve TV1, TV2 is arranged in each of the first hydraulic line HL1 and the second hydraulic line HL2, by means of which the first hydraulic line HL1 and the second hydraulic line HL2 can be at least partially reversibly shut off.

To increase the suction power of the pump P in the brake circuit BK1 in the motor-pump unit 90, a suction valve 70b is provided which connects the pump P in the brake circuit BK1 of the motor-pump unit 90 to the storage container 40. The motor-pump unit 90 can then also draw in pressure medium from the storage container 40 via the first hydraulic line HL1, the valve 69, the hydraulic supply line HL3, auxiliary piston chamber 23 and expansion bore 38. The suction power of the pump P in the brake circuit BK1 in the motor-pump unit 90 is then also not reduced by a hydraulic flow resistance of the valve TV1 or of the valve combination TV1/TV11.

The suction power of the pump P in the brake circuit BK2 in the motor-pump unit 90 when sucking in pressure medium from the storage container 40 via the valve TV2, the hydraulic line HL2, the valve 69 and the auxiliary piston chamber 23, is determined primarily by the hydraulic flow resistance of the valve TV2. To increase the suction power of the pump P in the brake circuit BK2 in the motor-pump unit 90, a suction valve 70c is provided which connects the second hydraulic line HL2 to the storage container 40. The pump P in the brake circuit BK1 of the motor-pump unit 90 can then also draw in pressure medium from the storage container 40 via the second hydraulic line HL2 and the suction valve 70c.

Furthermore, a fourth hydraulic line HL4 branches off from the first hydraulic line HL1. The fourth hydraulic line HL4 hydraulically connects the first brake circuit BK1 and the first pressure supply unit 6. A fourth isolating valve 74 is arranged within the fourth hydraulic line HL4, by means of which the hydraulic connection between the first brake circuit BK1 and the first pressure supply unit 6 can be at least partially reversibly disconnected. In the event of a leak of the pressure relief valve 80, the fourth isolating valve 74 can be closed so that the brake circuit BK1 does not fail.

An essential feature of the brake system 2 according to FIG. 4 is that no further pressure supply unit is required. The brake system 2 thus only has the first pressure supply unit 6 and the second pressure supply unit 14, which supply the two brake circuits BK1, BK2 with pressure medium.

In the fallback option, the second pressure supply unit 14 can be switched to one or both brake circuits BK1, BK2 via the valves TV1 and TV2 in the event of a failure of the first pressure supply unit 6, so that either one or both brake circuits BK1, BK2 is/are supplied with pressure medium by the second pressure supply unit 14. In the event of a failure of the control unit 9, both brake circuits BK1, BK2 are effective.

Figure 5A:
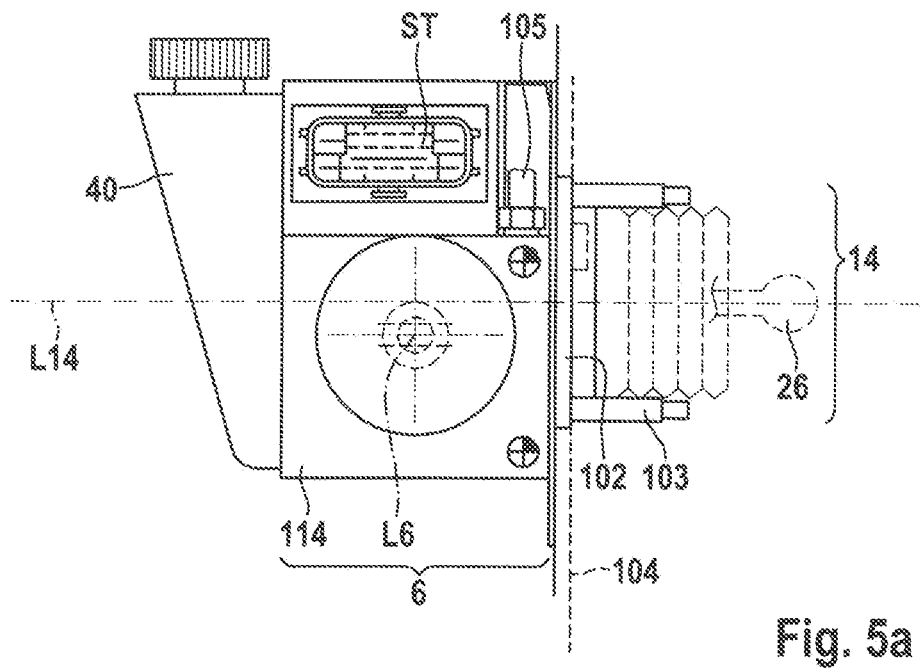
FIGS. 5a and 5b are schematic side views of a structural unit of the brake system.
Figure 5B:
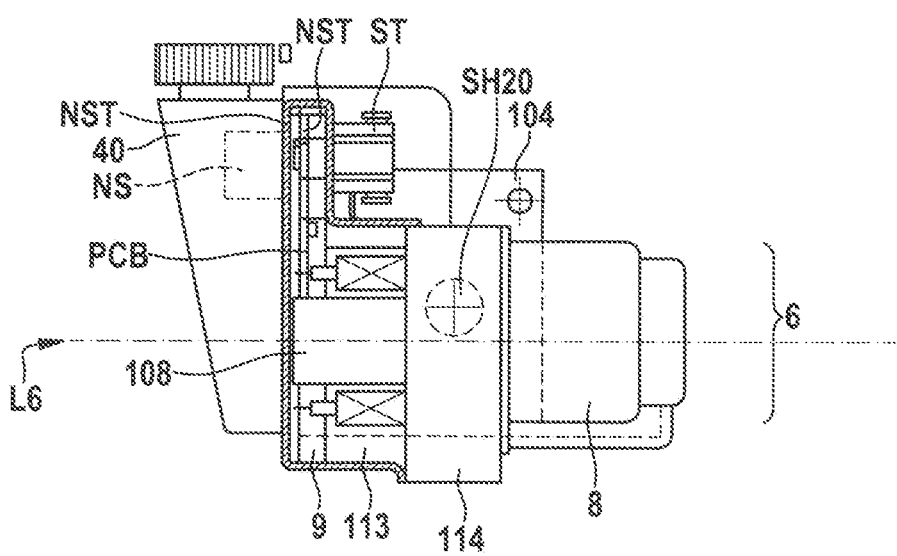

FIG. 5a and FIG. 5b illustrate one way in which the individual components of the X-booster, in particular the first and second pressure supply units 6, 14 and the associated valves, in particular the isolating valves 74, PD1, BP1, TV1, BP2, TVBK2, TV2, can be arranged in a housing.

FIG. 5a and FIG. 5b show in simplified form the basic elements of the assembly with electromotive drive 8, second pressure supply unit 14, in particular the HCU block 114 with the main brake cylinder 22, the first pressure supply unit (ECU), storage container 40 and other components (SH2, motor sensor and motor sensor housing).

The first pressure supply unit 6 has the electromotive drive 8, for example a spindle drive, as shown in FIG. 1, and a piston housing 108. The piston housing 108 is mounted on the HCU block 114 via a screw connection 101.

The spindle drive with piston 24 is arranged within the HCU block 114. In accordance with the invention, the piston stroke of the first pressure supply unit 6 can be very small, since the dimensioning of the electromotive drive 8 is designed for both a low pressure level, e.g., 120 bar, and a correspondingly smaller volume. A higher pressure level and also additional volume can be provided by the ESP unit. The valves required for the described function are also integrated in the HCU block 114.

Further integrated into the HCU block 114 is the SH2, which is connected to the actuating element 26. The HCU block 114 is connected to a mounting flange 102, which is screwed to the end wall 104 of the brake booster with mounting bolts 103.

The control unit 9 (ECU) with housing 113 is mounted on the HCU block 114.

The plug connector ST of the control unit 9 (ECU) is connected to the PCB. The PCB also carries the level sensor NS. The level sensor NS is designed to measure linearly so that even small leakage flows are detected. It detects the magnetic float NS or its position in the storage container 40. For the highest safety requirements, the level sensor NS can also be designed redundantly. The prerequisite for the described exemplary embodiment (without plug connector) is a corresponding arrangement of the storage container 40 behind the PCB (with respect to the drawing plane of FIG. 5b). This arrangement allows an extremely short overall length, which is advantageous in the event of a head-on collision.

The hydraulic connection lines 105 to the ESP unit for the brake circuits BK1, BK2 2 can be realized on the motor side or alternatively on the front side, preferably at an angle of approximately 45°. This facilitates assembly.

The plug connector ST is disposed above the HCU block 114. In the illustrated exemplary embodiment, a travel simulator housing 117 is separately formed and not integrated into the HCU block 114. Instead, a screw connection is provided to allow the position of the travel simulator 28 to be adjusted. This saves volume in the HCU block 114.

One aspect of the invention is that the first and second pressure supply unit 6, 14 are arranged substantially perpendicular to each other in the described housing. Due to the orientation of the pistons of the pressure supply units 6, 14, these have a direction of extension which are designated as L6 (=longitudinal axis of the first pressure supply unit 6) and L14 (=longitudinal axis of the second pressure supply unit 14) in FIGS. 5a and 5b. These two axes L6, L14 are perpendicular to each other in the shown exemplary embodiment, whereby a very compact arrangement of the pistons can be achieved. As can be seen from FIG. 5a, 5b, the longitudinal axes L6 and L14 do not lie in the same plane, but are arranged in two parallel-offset-planes. If the longitudinal axes L6 and L14 are mapped onto a common plane, the perpendicular course is obtained. The offset can be in the range of 1 to 15 cm.

Figure 6:
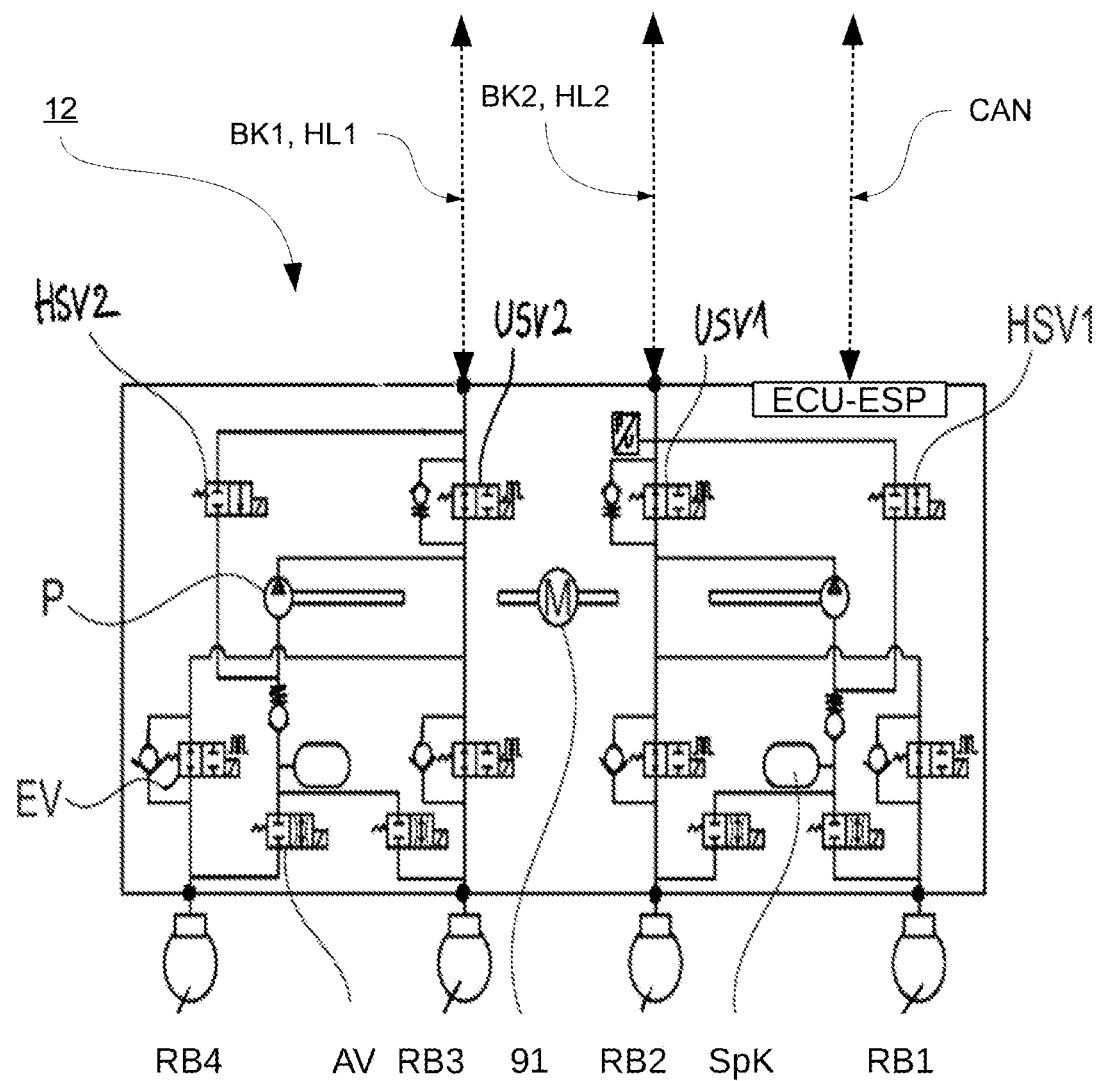
FIG. 6 is a schematic circuit diagram of an ESP unit.

FIG. 6 shows a schematic circuit diagram of ESP unit with the motor-pump unit 90 for use in the brake system 2 according to the invention. The ABS/ESP unit is known with the main components pump P with motor 91, the valves HSV1 and HSV2, USV1 and USV2, the inlet and outlet valves EV and AV associated with the wheel brakes RB1, RB2, RB3, RB4, and the storage chamber (SpK). This system is described in many publications and patent applications. It is already on the market as an e-booster and is used mainly in electric and hybrid vehicles, because here the control of the brake system takes place in cooperation with the braking torque of the generator, i.e. recuperation.

In one exemplary embodiment of the invention, the ESP unit can have a bidirectional valve HSV1, so that pressure can be released from the wheel brakes RB3, RB4 via this valve HSV1 in the event of a fault, bypassing the pump P. This design is particularly advantageous in conjunction with the selective pressure control in the brake circuits BK1, BK2.

In particular, an aspect of the invention in this embodiment may be that the control unit 9 is communicatively connected to the control unit 95 ("ECU-ESP") of the ESP unit and, to achieve the safety aspects already described, at least the intake and outlet valves AV are controllable by the control unit 9.

By saving a pressure supply unit, a further cost reduction is achieved compared to the embodiments of brake systems 2 described, for example, in the prior art.

At this juncture, it should be pointed out that all parts described above are to be regarded individually—even without features additionally described in the particular context, even if these have not been explicitly identified individually as being optional features in the particular context, e.g., by use of the following wording: in particular, preferably, for example, e.g., possibly, round brackets, etc.—and in combination or any sub-combination as independent embodiments or further developments of the invention as defined in particular in the introduction to the description as well as in the claims. Deviations from this are possible. Specifically, it should be noted that the wording "in particular" or round brackets do not denote features that are mandatory in the particular context.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SIGNS

2 Brake system
6, DV1 First pressure supply unit
8 Electromotive drive
9 Control unit (ECU)
10 Transmission
14, BE Second pressure supply unit
22 Main brake cylinder
23 Piston chamber
24 Piston
26 Actuating element
28, WS Travel simulator
28a, 28b Sealing element of the travel simulator
29 Travel simulator valve
30a, 30b Pedal travel sensor
32 Travel simulator piston
34 Spring element of the travel simulator
36 Spring
38 Expansion hole of the second pressure supply unit
40, VB Storage container
42a, 42b Auxiliary piston sealing element
44 Piston of the first pressure supply unit
46 Expansion hole of the piston of the first pressure supply unit
48 Control unit
50 Valve unit
62 Sensor element
69, FV Feed valve
70b, 70c, 80d, RV1, RV2, NV Suction valve
74, PD1 Fourth isolating valve
80, ÜV Pressure relief valve
90, DV2 Motor-pump unit
91 Drive
95 ESP unit control unit
101 Screw connection
102 Mounting flange
103 Mounting bolt
104 End wall
105 Connection lines
108 Piston housing
110 Sensor element
113 Control unit housing
114 HCU Block
117 Travel simulator housing
B1, B2 Electrical connections (three-phase)
P Pump
M Motor
BP1, TV1 First isolating valve
TVBK2, TV2 Second isolating valve
BP2 Third isolating valve
RB1, RB2, RB3, RB4 Wheel brake
DR Throttle
BK1 First brake circuit
BK2 Second brake circuit
HL1 First hydraulic line
HL2 Second hydraulic line
HL3 Third hydraulic line
HL4 Fourth hydraulic line
L6 Longitudinal axis of the first pressure supply unit
L14 Longitudinal axis of the second pressure supply unit
VA Front axle
HA Rear axle
TM1 Vehicle electric motor
RVHZ Check valve
CAN CAN1 bus
ST Plug connector
NS Float
NST Level sensor
HSV1, HSV2, USV1, USV2 ESP unit valves
AV Outlet valve
EV Inlet valve
SpK Storage chamber

What is claimed is:

1. A brake system, comprising:
a first pressure supply unit, with an electromotive drive, which is configured to supply pressure medium to at least one first brake circuit and to at least one second brake circuit,
a motor-pump unit configured to supply pressure medium to at least one of the brake circuits,
a second pressure supply unit which is configured to supply pressure medium to least one of the brake circuits, wherein the second pressure supply unit is connected to the motor-pump unit via at least one first hydraulic line and via at least one second hydraulic line, and wherein the second pressure supply unit comprises a main brake cylinder with exactly one piston and exactly one piston chamber, wherein the main brake cylinder comprises at least one expansion bore connected to a reservoir via a hydraulic line and comprises two ring seals, wherein the at least one expansion bore is arranged between the ring seals, and wherein a throttle is arranged in the hydraulic line between the reservoir and the expansion bore, and
a valve unit, wherein at least one of the brake circuits is connected to the second pressure supply unit via at least one third hydraulic line, wherein the valve unit comprises at least one feed valve via which the third hydraulic line is enabled to be at least partially reversibly shut off, and wherein an isolating valve is arranged in at least one of the hydraulic lines, via which the at least one of the hydraulic lines is enabled to be at least partially reversibly shut off.

2. The brake system according to claim 1, wherein at least one first isolating valve is arranged in the first hydraulic line, wherein the third hydraulic line and the first isolating valve are arranged in such a way that pressure medium from the second pressure supply unit passes into the second brake circuit via the first isolating valve and/or at least one second isolating valve is arranged in the second hydraulic line, wherein the second isolating valve is arranged such that a valve seat connection of the second isolating valve is hydraulically connected to the second brake circuit, and wherein the first isolating valve or the second isolating valve is a normally open valve.

3. The brake system according to claim 2, further comprising at least one third isolating valve, which is arranged and configured in such a way that in a closed state of the at least one third isolating valve, the first brake circuit is hydraulically decoupled from the first and second pressure supply unit, wherein the at least one third isolating valved is arranged such that a valve seat connection of the at least one third isolating valve is hydraulically connected to the first brake circuit, wherein the at least one third isolating valve and/or the at least one feed valve is a normally open valve.

4. The brake system according to claim 2, wherein the at least one first isolating valve is arranged in such a way that a valve seat connection of the at least one first isolating valve is hydraulically connected to the at least one second isolating valve and, via a fourth isolating valve, to the first pressure supply unit.

5. The brake system according to claim 4, wherein the first and second hydraulic line are enabled to be reversibly separated from the first pressure supply unit using the fourth isolating valve, and wherein the fourth isolating valve is arranged and designed in such a way that the first and second hydraulic line are disconnected from the first pressure supply unit in a closed state of the fourth isolating valve, and wherein the fourth isolating valve is a normally closed valve.

6. The brake system according to claim 2, wherein the third hydraulic line is connected to the first hydraulic line and, via the first isolating valve, to the second hydraulic line.

7. The brake system according to claim 2, wherein a travel simulator is provided, which is connected to the second pressure supply unit, and which includes two sealing elements.

8. The brake system according to claim 1, wherein the reservoir comprises a level sensor configured to detect a fill level of pressure medium within the reservoir, wherein a float with a magnet is arranged within the reservoir, the position of which float is enabled to be detected wirelessly, via detection of a magnetic field.

9. The brake system according to claim 8, wherein a control unit of the brake system is configured to perform a diagnosis to determine tightness of seals of the first and/or second pressure supply units, and/or to determine the existence of a leak, based on signals of the level sensor, wherein the electromotive drive of the first pressure supply unit has a redundant 3-phase electrical connection to enable actuation by a control unit.

10. The brake system according to claim 1, further comprising at least one pressure relief valve for component protection, wherein the pressure relief valve is in fluid connection with a working chamber of the first pressure supply unit.

11. The brake system according to claim 1, wherein the first hydraulic line and/or the second hydraulic line are connected to the reservoir via respective suction valves.

12. The brake system according to claim 1, further comprising an actuating element arranged on the second pressure supply unit, wherein the piston is actuatable by the actuating element.

13. The brake system according to claim 1, wherein the first pressure supply unit with a first piston-cylinder unit and the second pressure supply unit with a second piston-cylinder unit are arranged in a housing in such a way that a longitudinal axis of the first piston-cylinder unit is substantially perpendicular to a longitudinal axis of the second piston-cylinder unit.

14. A method for controlling a brake system that includes a first electromotively driven pressure supply unit arranged to supply pressure medium to at least first and second brake circuits, a motor-pump unit, a second pressure supply unit connected to the motor-pump unit via first and second hydraulic lines and arranged to supply pressure medium to at least one of the first or second brake circuits, wherein the second pressure supply unit comprises a main brake cylinder with exactly one piston and exactly one piston chamber, wherein the main brake cylinder comprises at least one expansion bore connected to a reservoir via a hydraulic line and comprises two ring seals, wherein the at least one expansion bore is arranged between the ring seals, and wherein a throttle is arranged in the hydraulic line between the reservoir and the expansion bore, the method comprising:

a. providing a first pressure at a first connection point for connection to the first brake circuit;

b. providing a second pressure at a second connection point for connection to the second brake circuit;

c. detecting a first fault condition corresponding to a loss of pressure medium in the first brake circuit;

d. closing at least a first isolating valve in response to the detection of the first fault condition, such that the first pressure supply unit is hydraulically decoupled from the first connection point.

15. The method according to claim 14, further comprising diagnosing a tightness of the first isolating valve by:

closing the first isolating valve and a second isolating valve;

building up pressure using the first pressure supply unit; and measuring a pressure at least over a predetermined time interval.

16. The method according to claim 14, further comprising detecting a second fault condition corresponding to an at least partial failure of an ESP unit, wherein, in response to the detection of the second fault condition, the following are performed:

reading in measurement signals of the ESP unit a via at least one bus; and implementing a control strategy for valves of the ESP unit, taking into account the measurement signals.

17. The method according to claim 14, further comprising:

detecting a third fault condition corresponding to failure of the first pressure supply unit and/or failure of the second brake circuit, wherein the following are performed in response to the detection of the third fault condition:

controlling valves in such a way that the first brake circuit is enabled to be supplied with pressure medium from the second pressure supply unit in order to brake a first axle of a vehicle; and simultaneously actuating a vehicle electric motor on a second axle in order to brake the second axle.

* * * * *